(12) United States Patent
Liu et al.

(10) Patent No.: US 12,219,507 B2
(45) Date of Patent: Feb. 4, 2025

(54) PERIODIC TRACKING REFERENCE SIGNALS FOR SIDELINK COMMUNICATIONS

(71) Applicant: QUALCOMM Incorporated, San Diego, CA (US)

(72) Inventors: Chih-Hao Liu, San Diego, CA (US); Jing Sun, San Diego, CA (US); Xiaoxia Zhang, San Diego, CA (US); Yisheng Xue, San Diego, CA (US); Tao Luo, San Diego, CA (US); Peter Gaal, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 428 days.

(21) Appl. No.: 17/651,569

(22) Filed: Feb. 17, 2022

(65) Prior Publication Data

US 2023/0262621 A1  Aug. 17, 2023

(51) Int. Cl.
*H04W 56/00* (2009.01)
*H04W 52/52* (2009.01)
*H04W 72/02* (2009.01)
*H04W 72/0446* (2023.01)
*H04W 72/0453* (2023.01)
*H04W 72/20* (2023.01)

(52) U.S. Cl.
CPC ......... *H04W 56/001* (2013.01); *H04W 52/52* (2013.01); *H04W 72/02* (2013.01); *H04W 72/0446* (2013.01); *H04W 72/0453* (2013.01); *H04W 72/20* (2023.01)

(58) Field of Classification Search
None
See application file for complete search history.

(56) References Cited

U.S. PATENT DOCUMENTS

| | | | | |
|---|---|---|---|---|
| 2021/0337514 A1* | 10/2021 | Xiang | .................... | H04W 72/20 |
| 2022/0141786 A1* | 5/2022 | Ruffini | ............. | H04W 56/0045 |
| | | | | 370/350 |
| 2023/0412341 A1* | 12/2023 | Jung | .................... | H04W 68/02 |
| 2024/0089774 A1* | 3/2024 | Du | .................... | H04W 36/0088 |

* cited by examiner

*Primary Examiner* — Saad Khawar
(74) *Attorney, Agent, or Firm* — QUALCOMM Incorporated

(57) ABSTRACT

Wireless communications systems and methods related to communicating information are provided. A method of wireless communication performed by a first sidelink user equipment (UE) may include receiving, from a second sidelink UE, an indicator indicating a tracking reference signal (TRS) periodicity, receiving, from the second sidelink UE, a TRS based on the TRS periodicity, acquiring time and frequency synchronization with the second sidelink UE based on the TRS, and receiving a physical sidelink shared channel (PSSCH) communication based on the time and frequency synchronization with the second sidelink UE.

30 Claims, 12 Drawing Sheets

PERIODIC TRACKING REFERENCE SIGNALS FOR SIDELINK COMMUNICATIONS

TECHNICAL FIELD

This application relates to wireless communication systems, and more particularly, to periodic tracking reference signals for sidelink communications.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

NR may support various deployment scenarios to benefit from the various spectrums in different frequency ranges, licensed and/or unlicensed, and/or coexistence of the LTE and NR technologies. For example, NR can be deployed in a standalone NR mode over a licensed and/or an unlicensed band or in a dual connectivity mode with various combinations of NR and LTE over licensed and/or unlicensed bands.

In a wireless communication network, a BS may communicate with a UE in an uplink direction and a downlink direction. Sidelink was introduced in LTE to allow a UE to send data to another UE (e.g., from one vehicle to another vehicle) without tunneling through the BS and/or an associated core network. The LTE sidelink technology has been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed frequency bands and/or unlicensed frequency bands (e.g., shared frequency bands).

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the disclosure, a method of wireless communication performed by a first sidelink user equipment (UE) may include receiving, from a second sidelink UE, an indicator indicating a tracking reference signal (TRS) periodicity; receiving, from the second sidelink UE, a TRS based on the TRS periodicity; acquiring time and frequency synchronization with the second sidelink UE based on the TRS; and receiving a physical sidelink shared channel (PSSCH) communication based on the time and frequency synchronization with the second sidelink UE.

In an additional aspect of the disclosure, a method of wireless communication performed by a first sidelink user equipment (UE) may include transmitting, to a second sidelink UE, an indicator indicating a tracking reference signal (TRS) periodicity; transmitting, to the second sidelink UE, a TRS based on the TRS periodicity; and transmitting, to the second sidelink UE synchronized in time and frequency with the first sidelink UE, a physical sidelink shared channel (PSSCH) communication.

In an additional aspect of the disclosure, a first sidelink user equipment (UE) may include a memory; a transceiver; and at least one processor coupled to the memory and the transceiver, wherein the first sidelink UE is configured to receive, from a second sidelink UE, an indicator indicating a tracking reference signal (TRS) periodicity; receive, from the second sidelink UE, a TRS based on the TRS periodicity; acquire time and frequency synchronization with the second sidelink UE based on the TRS; and receive a physical sidelink shared channel (PSSCH) communication based on the time and frequency synchronization with the second sidelink UE.

In an additional aspect of the disclosure, a first sidelink user equipment (UE) may include a memory; a transceiver; and at least one processor coupled to the memory and the transceiver, wherein the first sidelink UE is configured to transmit, to a second sidelink UE, an indicator indicating a tracking reference signal (TRS) periodicity; transmit, to the second sidelink UE, a TRS based on the TRS periodicity; and transmit, to the second sidelink UE synchronized in time and frequency with the first sidelink UE, a physical sidelink shared channel (PSSCH) communication.

Other aspects, features, and instances of the present invention will become apparent to those of ordinary skill in the art, upon reviewing the following description of specific, exemplary instances of the present invention in conjunction with the accompanying figures. While features of the present invention may be discussed relative to certain aspects and figures below, all instances of the present invention can include one or more of the advantageous features discussed herein. In other words, while one or more instances may be discussed as having certain advantageous features, one or more of such features may also be used in accordance with the various instances of the invention discussed herein. In similar fashion, while exemplary aspects may be discussed below as device, system, or method instances it should be understood that such exemplary instances can be implemented in various devices, systems, and methods.

DETAILED DESCRIPTION

Figure 1:
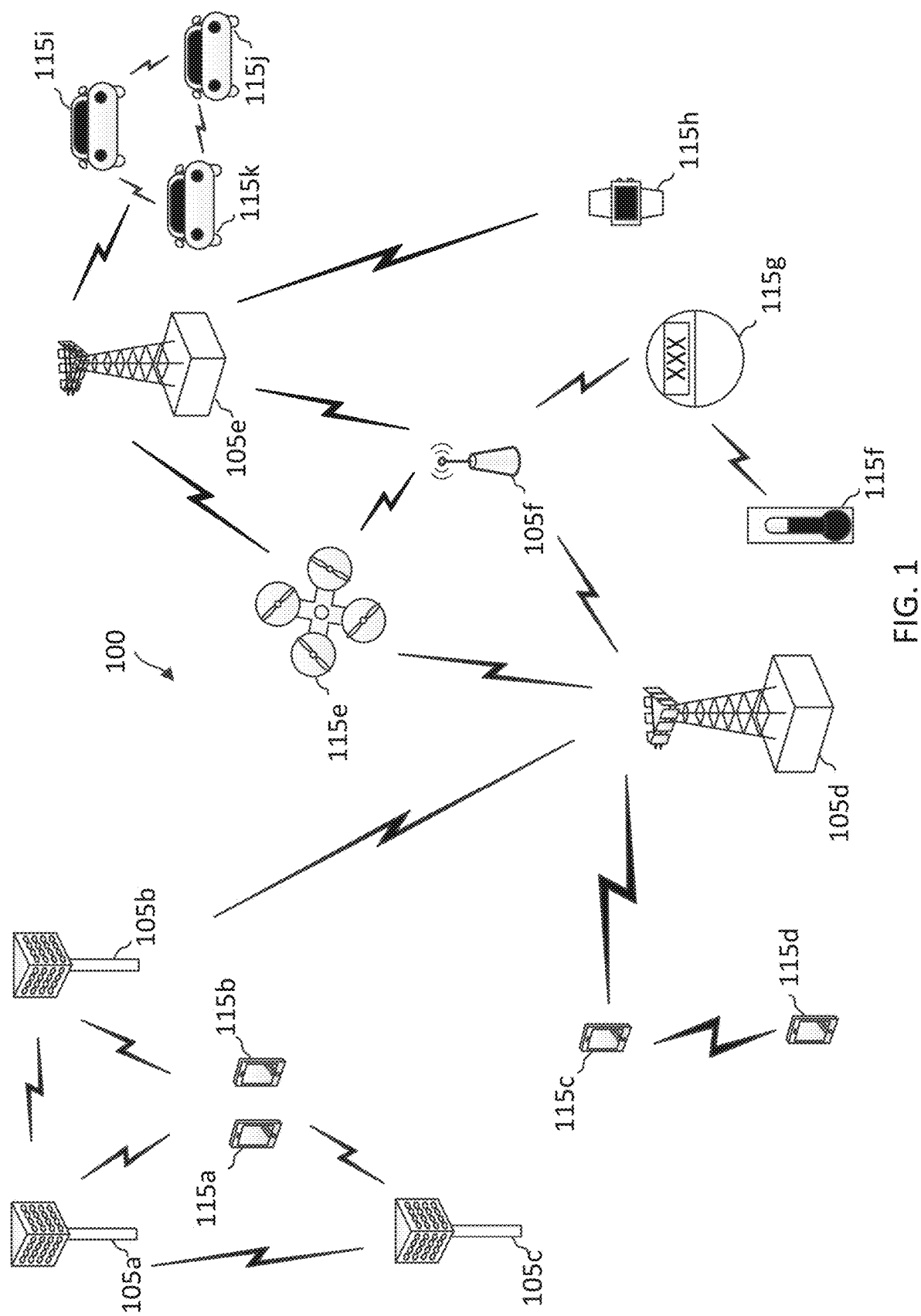
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various instances, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronic Engineers (IEEE) 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The deployment of NR over an unlicensed spectrum is referred to as NR-unlicensed (NR-U). Federal Communications Commission (FCC) and European Telecommunications Standards Institute (ETSI) are working on regulating 6 GHz as a new unlicensed band for wireless communications. The addition of 6 GHz bands allows for hundreds of megahertz (MHz) of bandwidth (BW) available for unlicensed band communications. Additionally, NR-U can also be deployed over 2.4 GHz unlicensed bands, which are currently shared by various radio access technologies (RATs), such as IEEE 802.11 wireless local area network (WLAN) or WiFi and/or license assisted access (LAA). Sidelink communications may benefit from utilizing the additional bandwidth available in an unlicensed spectrum. However, channel access in a certain unlicensed spectrum may be regulated by authorities. For instance, some unlicensed bands may impose restrictions on the power spectral density (PSD) and/or minimum occupied channel bandwidth (OCB) for transmissions in the unlicensed bands. For example, the unlicensed national information infrastructure (UNIT) radio band has a minimum OCB requirement of about 70 percent (%).

Some sidelink systems may operate over a 20 MHz bandwidth in an unlicensed band. ABS may configure a sidelink resource pool over the 20 MHz band for sidelink communications. A sidelink resource pool is typically partitioned into multiple frequency subchannels or frequency subbands (e.g., about 5 MHz each) and a sidelink UE may select a sidelink resource (e.g., a subchannel) from the sidelink resource pool for sidelink communication. To satisfy an OCB of about 70%, a sidelink resource pool may utilize a frequency-interlaced structure. For instance, a frequency-interlaced-based sidelink resource pools may include a plurality of frequency interlaces over the 20 MHz band, where each frequency interlace may include a plurality of resource blocks (RBs) distributed over the 20 MHz band. For example, the plurality of RBs of a frequency interlace may be spaced apart from each other by one or more other RBs in the 20 MHz unlicensed band. A sidelink UE may select a sidelink resource in the form of frequency interlaces from the sidelink resource pool for sidelink communication. In other words, sidelink transmissions may utilize a frequency-interlaced waveform to satisfy an OCB of the unlicensed band. However, S-SSBs may be transmitted in a set of contiguous RBs, for example, in about eleven contiguous RBs. As such, S-SSB transmissions alone may not meet the OCB requirement of the unlicensed band. Accordingly, it may be desirable for a sidelink sync UE to multiplex an S-SSB transmission with one or more channel state information reference signals (CSI-RSs) in a slot configured for S-SSB transmission so that the sidelink sync UE's transmission in the slot may comply with an OCB requirement.

The present application describes mechanisms for a sidelink UE to multiplex an S-SSB transmission with a CSI-RS transmission in a frequency band to satisfy an OCB of the frequency band. For instance, the sidelink UE may determine a multiplex configuration for multiplexing a CSI-RS transmission with an S-SSB transmission in a sidelink BWP. The sidelink UE may transmit the S-SSB transmission in the sidelink BWP during a sidelink slot. The sidelink UE may transmit one or more CSI-RSs in the sidelink BWP during the sidelink slot by multiplexing the CSI-RS and the S-SSB transmission based on the multiplex configuration.

In some aspects, the sidelink UE may transmit the S-SSB transmission at an offset from a lowest frequency of the sidelink BWP based on a synchronization raster (e.g., an NR-U sync raster). In some aspects, the sidelink UE may transmit the S-SSB transmission aligned to a lowest frequency of the sidelink BWP. For instance, a sync raster can be defined for sidelink such that the S-SSB transmission may be aligned to a lowest frequency of the sidelink BWP.

In some aspects, the multiplex configuration includes a configuration for multiplexing the S-SSB transmission with a frequency interlaced waveform sidelink transmission to meet the OCB requirement. For instance, the sidelink transmission may include a CSI-RS transmission multiplexed in frequency within a frequency interlace with RBs spaced apart in the sidelink BWP. In some instances, the sidelink UE may rate-match the CSI-RS transmission around RBs that are at least partially overlapping with the S-SSB transmission.

In some aspects, the multiplex configuration includes a configuration for multiplexing the S-SSB transmission with a subchannel-based sidelink transmission to meet the OCB requirement. For instance, the sidelink transmission may include a CSI-RS transmission multiplexed in time within a subchannel including contiguous RBs in the sidelink BWP. For instance, the S-SSB transmission may be transmitted at a low frequency portion of the sidelink BWP, and the CSI-RS may be transmitted in a subchannel located at a high frequency portion of the sidelink BWP to meet the OCB.

In some aspects, a BS may configure different sidelink resource pools for slots that are associated with S-SSB transmissions and for slots that are not associated with S-SSB transmissions. For instance, the BS may configure a first resource pool with a frequency-interlaced structure for slots that are not configured for S-SSB transmissions. The first resource pool may include a plurality of frequency interlaces (e.g., distributed RBs), where each frequency interlace may carry a PSCCH/PSSCH transmission. The BS may configure a second resource pool with a subchannel-based structure for slots that are configured for S-SSB transmission. The second resource pool may include a plurality of frequency subchannels (e.g., contiguous RBs), where each subchannel may carry a PSCCH/PSSCH transmission. To satisfy an OCB in a sidelink slot configured for an S-SSB transmission, the sidelink UE (e.g., a sidelink sync UE) may transmit an S-SSB transmission multiplexed with a CSI-RS transmission. For instance, the S-SSB transmission may be transmitted in frequency resources located at a lower frequency portion of a sidelink BWP and the CSI-RS transmission may be transmitted in frequency resources located at higher frequency portion of the sidelink BWP.

FIG. 1 illustrates a wireless communication network 100 according to some aspects of the present disclosure. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links (e.g., S1, S2, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a vehicle (e.g., a car, a truck, a bus, an autonomous vehicle, an aircraft, a boat, etc.). Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V), vehicle-to-everything (V2X), cellular-vehicle-to-everything (C-V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some instances, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some instances, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some instances, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In some instances, a UE 115 attempting to access the network 100 may perform an initial cell search by detecting a PSS from a BS 105. The PSS may enable synchronization of period timing and may indicate a physical layer identity value. The UE 115 may then receive an SSS. The SSS may enable radio frame synchronization, and may provide a cell identity value, which may be combined with the physical layer identity value to identify the cell. The SSS may also enable detection of a duplexing mode and a cyclic prefix length. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In some aspects, the UE 115c may receive an indicator indicating a tracking reference signal (TRS) periodicity from the UE 115a. The UE 115c may receive a TRS based on the TRS periodicity from the UE 115a. The UE 115c may acquire time and/or frequency synchronization with the UE 115a based on the TRS. The UE 115c may receive a physical sidelink shared channel (PSSCH) communication from the UE 115a based on the time and/or frequency synchronization with the UE 115a. Aspects of the present disclosure may increase time and/or frequency synchronization between the UE 115c and the UE 115a (e.g., sidelink UEs) thereby increasing the probability of successful decoding of communications by the UE 115c.

Figure 2:
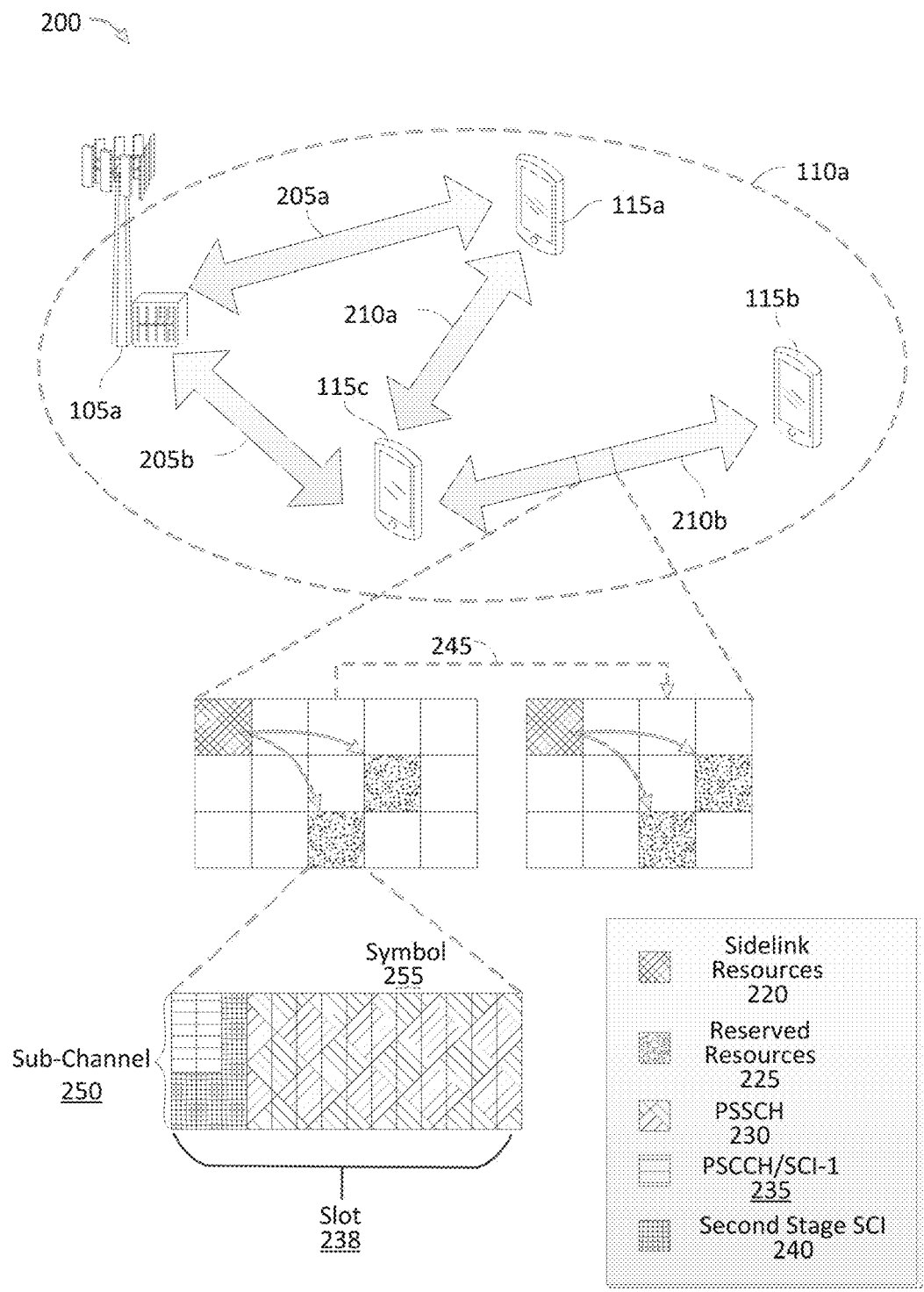
FIG. 2 illustrates a sidelink wireless communication network according to some aspects of the present disclosure.

FIG. 2 illustrates sidelink resources associated with a wireless communication network 200 according to some aspects of the present disclosure. The wireless communications network 200 may include a base station 105a and UEs 115a, 115b, and 115c, which may be examples of a BS 105 and a UE 115 as described with reference to FIG. 1. Base station 105a and UEs 115a and 115c may communicate within geographic coverage area 110a and via communication links 205a and 205b, respectively. UE 115c may communicate with UEs 115a and 115b via sidelink communication links 210a and 210b, respectively. In some examples, UE 115c may transmit SCI to UEs 115a and 115b via the sidelink control resources 220. The SCI may include an indication of resources reserved for retransmissions by UE 115c (e.g., the reserved resources 225). In some examples, UEs 115a and 115b may determine to reuse one or more of the reserved resources 225.

In some aspects, a device in the wireless communication network 200 (e.g., a UE 115, a BS 105, or some other node) may convey SCI to another device (e.g., another UE 115, a BS 105, sidelink device or vehicle-to-everything (V2X) device, or other node). The SCI may be conveyed in one or more stages. The first stage SCI may be carried on the PSCCH while the second stage SCI may be carried on the corresponding PSSCH. For example, UE 115c may transmit a PSCCH/first stage SCI 235 (e.g., SCI-1) to each sidelink UE 115 in the network (e.g., UEs 115a and 115b) via the sidelink communication links 210. The PSCCH/first stage SCI-1 235 may indicate resources that are reserved by UE 115c for retransmissions (e.g., the SCI-1 may indicate the reserved resources 225 for retransmissions). Each sidelink UE 115 may decode the first stage SCI-1 to determine where the reserved resources 225 are located (e.g., to refrain from using resources that are reserved for another sidelink transmission and/or to reduce resource collision within the wireless communications network 200). Sidelink communication may include a mode 1 operation in which the UEs 115 are in a coverage area of BS 105a. In mode 1, the UEs 115 may receive a configured grant from the BS 105a that defines parameters for the UEs 115 to access the channel. Sidelink communication may also include a mode 2 operation in which the UEs 115 operate autonomously from the BS 105a and perform sensing of the channel to gain access to the channel. In some aspects, during mode 2 sidelink operations, the sidelink UEs 115 may perform channel sensing to locate resources reserved by other sidelink transmissions. The first stage SCI-1 may reduce the need for sensing each channel. For example, the first stage SCI-1 may include an explicit indication such that the UEs 115 may refrain from blindly decoding each channel. The first stage SCI-1 may be transmitted via the sidelink control resources 220. The sidelink control resources 220 may be configured resources (e.g., time resources or frequency resources) transmitted via a PSCCH 235. In some examples, the PSCCH 235 may be configured to occupy a number of physical resource blocks (PRBs) within a selected frequency. The frequency may include a single subchannel 250 (e.g., 10, 12, 15, 20, 25, or some other number of RBs within the subchannel 250). The time duration of the PSCCH 235 may be configured by the BS 105a (e.g., the PSCCH 235 may span 1, 2, 3, or some other number of symbols 255).

The first stage SCI-1 may include one or more fields to indicate a location of the reserved resources 225. For example, the first stage SCI-1 may include, without limitation, one or more fields to convey a frequency domain resource allocation (FDRA), a time domain resource allocation (TDRA), a resource reservation period 245 (e.g., a period for repeating the SCI transmission and the corresponding reserved resources 225), a modulation and coding scheme (MCS) for a second stage SCI-2 240, a beta offset value for the second stage SCI-2 240, a DMRS port (e.g., one bit indicating a number of data layers), a physical sidelink feedback channel (PSFCH) overhead indicator, a priority, one or more additional reserved bits, or a combination thereof. The beta offset may indicate the coding rate for transmitting the second stage SCI-2 240. The beta offset may indicate an offset to the MCS index. The MCS may be indicated by an index ranging from 0 to 31. For example, if the MCS is set at index 16 indicating a modulation order of 4 and a coding rate of 378, the beta offset may indicate a value of 2 thereby setting the coding rate to 490 based on an MCS index of 18. In some examples, the FDRA may be a number of bits in the first stage SCI-1 that may indicate a number of slots 238 and a number of subchannels reserved for the reserved resources 225 (e.g., a receiving UE 115 may determine a location of the reserved resources 225 based on the FDRA by using the subchannel 250 including the PSCCH 235 and first stage SCI-1 as a reference). The TDRA may be a number of bits in the first stage SCI-1 (e.g., 5 bits, 9 bits, or some other number of bits) that may indicate a number of time resources reserved for the reserved resources 225. In this regard, the first stage SCI-1 may indicate the reserved resources 225 to the one or more sidelink UEs 115 in the wireless communication network 200.

In some aspects, the BS 105 may configure a sidelink UE 115 as a sidelink sync UE (e.g., the UE 115c). When operating as a sidelink sync UE, the UE 115 may broadcast S-SSBs which may include synchronization signals (e.g., PSS and/or SSS) and sidelink system information, such as a sidelink BWP configuration, one or more sidelink transmit resource pools, and/or one or more sidelink receive resource pools, S-SSB transmission related parameters (e.g., sidelink slots 238 configured for S-SSB transmission and/or S-SSB transmission periodicity), and/or any other configuration information related to sidelink communications as will be discussed more fully below. Accordingly, other UEs (e.g., the UEs 115d and 115e) that are nearby the UE 115c, but may be out of the coverage of the BS 105 may listen to and synchronize to the S-SSBs and communicate with each other based on the S-SSBs.

In some aspects, the UE 115c may receive an indicator indicating a tracking reference signal (TRS) periodicity from the UE 115a. The UE 115c may receive a TRS based on the TRS periodicity from the UE 115a. The UE 115c may acquire time and/or frequency synchronization with the UE 115a based on the TRS. The UE 115c may receive a physical sidelink shared channel (PSSCH) communication from the UE 115a based on the time and/or frequency synchronization with the UE 115a. Aspects of the present disclosure may increase time and/or frequency synchronization between the UE 115c and the UE 115a (e.g., sidelink UEs) thereby increasing the probability of successful decoding of communications by the UE 115c.

Figure 3:
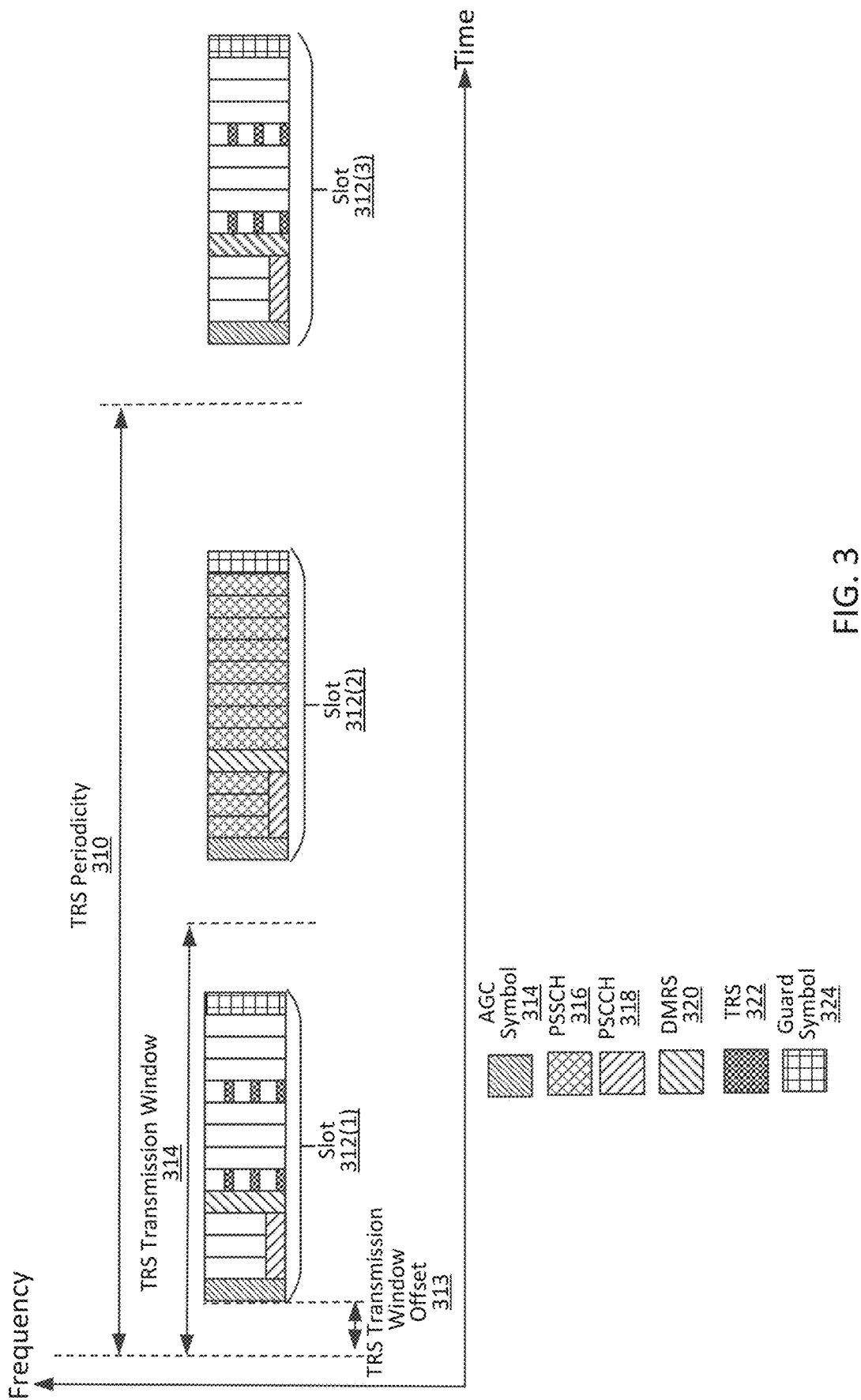
FIGS. 3-5 illustrate tracking reference signal resources according to some aspects of the present disclosure.

FIG. 3 illustrates tracking reference signal (TRS) 322 resources according to some aspects of the present disclosure. In FIG. 3, the x-axis represents time in some arbitrary units and the y-axis represents frequency in some arbitrary units. In some aspects, a first sidelink UE (e.g., the UE 115 or the UE 900) may receive an indicator indicating a tracking reference signal (TRS) periodicity 310. The first sidelink UE may receive the indicator from a second sidelink UE. In some aspects, the first sidelink UE may periodically receive a TRS 322 from the second sidelink UE based on the TRS periodicity 310. In this regard, the first sidelink UE may receive a TRS configuration including the indicator indicating the TRS periodicity 310. The first sidelink UE may receive the TRS configuration from the second sidelink UE via SCI (e.g., SCI-1 and/or SCI-2), a PSSCH 316, a PSCCH 318, an RRC message, a MAC-CE message, or other suitable communication. Additionally or alternatively, the first sidelink UE may receive an indicator of the TRS periodicity 310 from a BS (e.g., the BS 105 or 1000) via a PDCCH, a PDSCH, DCI, an RRC message, a MAC-CE message, or other suitable communication.

The TRS periodicity 310 may be based on a mobility associated with the first sidelink UE and/or the second sidelink UE. For example, the first sidelink UE and/or the second sidelink UE may be a stationary device (e.g., an IoT device such as a programmable logic controller (PLC) or roadside unit (RSU)) configured with a longer TRS periodicity 310 as compared to a mobile UE (e.g., a vehicle or a smartphone) configured with a shorter TRS periodicity 310. A higher mobility device may be configured with a shorter TRS periodicity 310 in order to update the time/frequency synchronization to compensate for a Doppler frequency shift and/or other changes associated with the device changing positions. In some aspects, the second sidelink UE may transmit TRS(s) 322 at different TRS periodicities 310 based on the mobility of the first sidelink UE. In this regard, the first sidelink UE may transmit an indicator to the second UE indicating a mobility associated with the first sidelink UE. For example, the indicator may include a type (e.g., a class) of UE (e.g., a vehicle, a sensor, a PLC, a roadside unit) that indicates a mobility of the first sidelink UE. In some aspects, the first sidelink UE may transmit to the second sidelink UE an indication of the first sidelink UE's speed and/or direction. The first sidelink UE's speed and direction may be determined based on a GPS receiver, RF triangulation, or other suitable method. In some aspects, the second sidelink UE may transmit a new TRS periodicity 310 to the first sidelink UE when the mobility of the first sidelink UE changes (e.g., when the mobility change of the first sidelink UE satisfies a threshold).

The TRS periodicity 310 may indicate the times at which the first sidelink UE receives the TRS(s) 322 from the second sidelink UE. The first UE may receive an indicator indicating a TRS window 314 (e.g., a resource selection window). The TRS window 314 may be a time period in which the first sidelink UE receives the TRS(s) 322. The TRS window 314 may be indicated in the communication that includes the indicator indicating the TRS periodicity 310 and/or the UE may receive the indicator indicating the TRS window 314 in a separate communication. For example, the first sidelink UE may receive the indicator indicating the TRS window 314 from the second sidelink UE via SCI (e.g., SCI-1 and/or SCI-2), a PSSCH 316, a PSCCH 318, an RRC message, a MAC-CE message, or other suitable communication. The TRS window 314 may indicate a starting time and/or an ending time in which the first sidelink UE may receive the TRS(s) 322. In this regard, the starting time may correspond to a first slot 312 index and the ending time may correspond to a second slot 312 index (e.g., the last slot in the TRS window 314). In some instances, the first sidelink UE may receive the TRS(s) 322 in any slot 312 between the first slot 312 index and the second slot 312 index defining the TRS window 314, including the slots 312 associated with the first and second slot indexes. In this regard, the first sidelink UE may receive the symbol index indication in a time domain resource allocation (TDRA). The TDRA may be carried by SCI-1 via the PSCCH 318. The second sidelink UE may randomly select a slot 312 within the TRS window 314 for transmitting the TRS(s) 322.

In some aspects, the first sidelink UE may receive an indicator indicating which slot in the TRS window 314 the second sidelink UE will transmit the TRS(s) 322. For example, the indicator may correspond to a TRS transmission window offset 313 from the beginning of the TRS window 314 and/or a slot index (e.g., slot index 312(1), 312(2), or 312(3)). The slot 312 index may be indicated in the communication that includes the indicator indicating the TRS periodicity 310 and/or the indicator indicating the TRS window 314, and/or the first sidelink UE may receive the indicator indicating the slot 312 index in a separate communication. For example, the first sidelink UE may receive the indicator indicating the slot 312 index from the second sidelink UE via SCI (e.g., SCI-1 and/or SCI-2), a PSSCH 316, a PSCCH 318, an RRC message, a MAC-CE message, or other suitable communication. Different TRS 322 transmitting UEs may select different offsets 313 from the beginning of the TRS window 314 in order to avoid resource collision among the sidelink UEs intending to transmit TRS(s) 322. In some aspects, the second sidelink UE may select (e.g., randomly select) a different slot 312 in the TRS window 314 for each instance of periodic TRS 322 transmission. In this case, the second sidelink UE may transmit the indicator of the selected TRS slot 312 to the first sidelink UE before (e.g., x slots before) transmitting the TRS(s) 322.

In some aspects the first sidelink UE may receive a communication including a TRS 322 from the second sidelink UE in slot 312(1) that does not include a PSSCH 316 before (e.g., immediately before) receiving a communication from the second sidelink UE in slot 312(2) that does include a PSSCH 316. As shown in FIG. 3, the first sidelink UE may receive the TRS 322 in slot 312(1) without a PSSCH 316 before receiving a communication in slot 312(2) with a PSSCH 316 in order to synchronize time and frequency (e.g., perform time/frequency compensation) with the second sidelink UE before decoding the PSSCH 316. In this manner, the time and frequency may be better synchronized with the second sidelink UE increasing the probability of successful decoding of the PSSCH 316 as compared to receiving the TRS 322 in slot 312(3) after the PSSCH 316.

Figure 4:
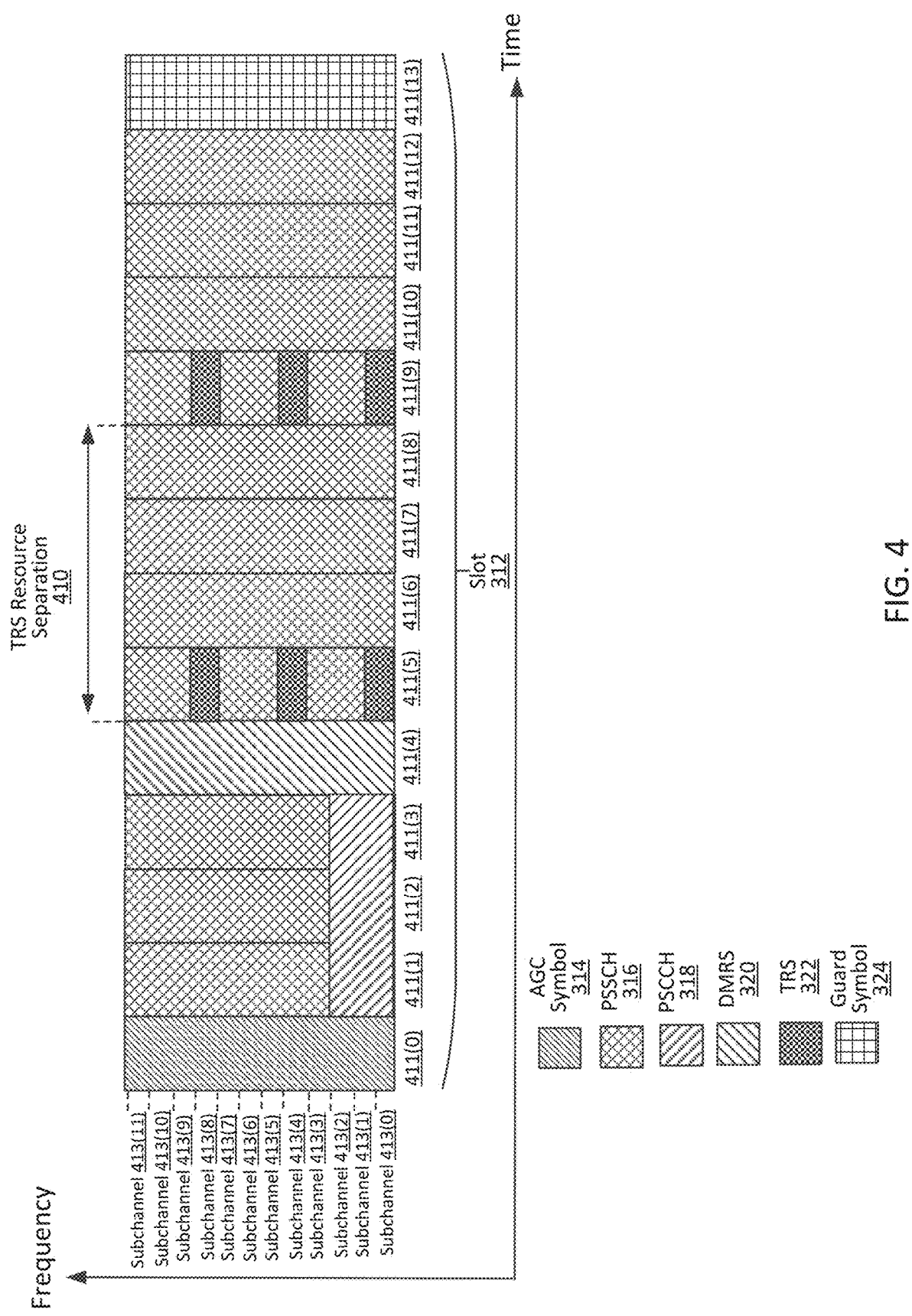

FIG. 4 illustrates tracking reference signal (TRS) 322 resources according to some aspects of the present disclosure. In FIG. 4, the x-axis represents time in some arbitrary units and the y-axis represents frequency in some arbitrary units. In some aspects, a first sidelink UE (e.g., the UE 115 or the UE 900) may receive a TRS 322 from the second sidelink UE based on the TRS periodicity, the TRS window, and/or the slot 312 index. In some aspects, the first sidelink UE may receive the TRS(s) 322 in time/frequency resources of a slot 312 indicated by the slot index. In this regard, the second sidelink UE may randomly select the time/frequency resources for transmitting the TRS(s) 322. The first sidelink UE may receive the TRS(s) 322 in a symbol 411 of the slot 312 after one or more symbols 411 that include a physical sidelink control channel (PSCCH) 318. The first sidelink UE may receive the TRS(s) 322 in a symbol 411 of the slot 312 after the PSCCH 318 to avoid puncturing the SCI-1 carried by the PSCCH 318. The TRSs may be transmitted in symbols 411 that do not include a DMRS 320 to avoid collision with the DMRS 320. The first sidelink UE may receive one or more TRSs 322 in the slot 312. For example, the first sidelink UE may receive multiple TRSs 322 from multiple sidelink UEs including the second sidelink UE. In some instances, when the first sidelink UE receives multiple TRSs 322 in a slot 312, the TRSs 322 may be separated by TRS resource separation 410 (e.g., n number of symbols in a comb-n pattern). The multiple TRSs 322 may be separated by one, two, three, four, or more symbols 411 in a comb-n pattern (e.g., where n equals one, two, three, four, or more). The first sidelink UE may receive the multiple TRSs 322 in symbols 411 after a PSCCH symbol 318. In some aspects, the first sidelink UE may receive PSSCHs 316 in symbols 411 between the symbols 411 in which the first sidelink UE receives the TRSs 322. For example, the first sidelink UE may receive the multiple TRSs 322 in symbols 411(5) and 411(9) and receive the PSSCHs 316 in symbols 411(6)-411(8). In some aspects, the first sidelink UE may receive an indication from the second sidelink UE indicating the symbols 411 (e.g., the symbol indexes 411(0) . . . 411(13)) of the slot 312 in which the TRSs 322 will be received. In this regard, the first sidelink UE may receive the symbol index indication in a time domain resource allocation (TDRA). The TDRA may be carried by SCI-1 via the PSCCH 318.

In some aspects, the first sidelink UE may receive multiple TRSs 322 in a slot 312 where each TRS 322 in the slot 312 is separated by m number of frequency subchannels in a comb-m pattern. The multiple TRSs 322 may be separated by one, two, three, four, or more subchannels in a comb-m pattern (e.g., where m equals one, two, three, four, or more). In some aspects, the first sidelink UE may receive an indication from the second sidelink UE indicating the subchannels 413 in which the TRSs 322 will be transmitted. In this regard, the first sidelink UE may receive the indication in a frequency domain resource allocation (FDRA). The FDRA may be carried by SCI-1 via a PSCCH 318. In some aspects, the time/frequency resources and/or the comb pattern may be indicated to the first sidelink UE as a pattern index by the second sidelink UE via SCI. In some instances, the pattern index may indicate a preconfigured combination of time/frequency resources and the comb pattern. The first sidelink UE may receive the TRS(s) 322 from the second sidelink UE in corresponding time/frequency resources of periodic slots 312. In other words, each of the periodic slots 312 that include the TRS(s) 322 from the second sidelink UE may include the TRS(s) 322 in the same symbol indexes 411 and/or the same frequency subchannels 413.

The first sidelink UE may receive multiple TRSs 322 in symbols 411 following the PSCCH 318 where each TRS 322 in the slot 411 is separated by m number of frequency subchannels in a comb-m pattern. The multiple TRSs may be separated by one, two, three, four, or more subchannels in a comb-m pattern (e.g., where m equals one, two, three, four, or more). Each of the TRSs 322 may be transmitted in the same or different frequency subchannel(s) 413. For example, a first TRS 322 may be transmitted in a first subchannel (e.g., subchannel index 413(0)), a second TRS 322 may be transmitted in a second subchannel (e.g., subchannel index 413(0+x)), a third TRS 322 may be transmitted in a third subchannel (e.g., subchannel index 413(0+2x)), etc. Each of the subchannels 413 may be separated by x number of subchannels. In some aspects, the first sidelink UE may receive an indication in a FDRA from the second sidelink UE indicating the subchannels 413 in which the TRSs 322 will be transmitted. The FDRA may be carried by SCI (e.g., SCI-1 and/or SCI-2) via the PSCCH 318.

In some aspects, the first sidelink UE may receive the TRS(s) 322 from the second sidelink UE in a slot 312 that includes a PSSCH 316. The slot may include an indicator (e.g., a trigger) in the SCI-1 and/or the SCI-2 that indicates to the first sidelink UE that the slot includes the TRS(s) 322 and/or the PSSCH 316. Before decoding the SCI-2, the first sidelink UE may not know that the slot includes a TRS 322. The SCI-2 may have a common configuration among the sidelink UEs, including the first sidelink UE, such that the sidelink UEs may decode the SCI-2 from each sidelink UE that is transmitting a TRS 322. The TRSs 322 may be transmitted in symbols 411 after the symbols 411 that include the SCI-2 (e.g., symbols 411(4)-411(12)). The TRSs 322 may be transmitted in symbols 411 that do not include a DMRS 320 to avoid collision with the DMRS 320. The first sidelink UE may decode the SCI-2 to determine if the PSSCH 316 is intended for the first sidelink UE by matching the UE destination ID in the SCI-2 with the ID associated with the first sidelink UE. The TRS(s) 322 may be carried by symbols 411 different from the symbols 411 carrying the PSSCH 316 enabling the transmit power associated with the TRS(s) 322 to remain constant.

In some aspects, the first sidelink UE may receive the TRS(s) 322 in time/frequency resources of a dedicated resource pool. The dedicated resource pool may reserve slots exclusively for periodic transmission of TRSs 322. The transmission of PSSCHs 316 may be excluded from the resources of the dedicated resource pool. The resources of a dedicated resource pool may be determined and/or set by the second sidelink UE transmitting the TRS(s) 322, another sidelink UE transmitting TRS(s) 322 (e.g., a master UE, a high-end sidelink UE such as a programmable logic controller or roadside unit), a BS (e.g., the BS 105 or 1000), or other suitable device. The sidelink UEs intending to transmit PSSCHs 316 may receive an indication of the resources associated with the dedicated resource pool and avoid scheduling PSSCH 316 transmissions in those resources. The sidelink UEs intending to transmit PSSCHs 316 may receive the indication of the resources of the dedicated resource pool via SCI-1, SCI-2, or other suitable communication. The sidelink UEs intending to transmit TRS(s) 322 in the dedicated resource pool (e.g., reserved periodic slots) may select (e.g., randomly select) resources from the dedicated resource pool. For example, the second sidelink UE may select contiguous symbol indexes 411(4)-411(7) and frequency comb index 0 in the reserved periodic slot 312 while another sidelink UE may select contiguous symbol indexes 411(8)-411(11) and frequency comb index 1 in the reserved periodic slot 312. Each of the sidelink UEs intending to transmit TRS(s) 322 may receive the indication of the dedicated resource pool and the resources selected by other TRS 322 transmitting UEs in order to avoid selecting resources previously selected by the other TRS 322 transmitting UEs.

In some aspects, one or more sidelink UEs may transmit PSSCHs 316 in the same slot 312 as the TRS(s) 322 transmitted by the second sidelink UE. In this case, the one or more sidelink UEs intending to transmit PSSCHs 316 may rate match around the resource elements scheduled to carry the TRS(s) 322 transmitted by the second sidelink UE and other sidelink UEs. The one or more UEs may schedule the transmission of the PSSCHs 316 in resource elements (REs) other than the REs used to carry the TRS(s) 322 to avoid interfering with the TRS(s) 322. In some instances, the one or more sidelink UEs may determine the TRS rate match patterns by receiving SCI from the sidelink UEs that are scheduling the TRS(s) 322. The SCI transmitted by the sidelink UEs that are scheduling the TRS(s) 322 may indicate the REs (e.g., a TRS resource pattern field) in the slot 312 that the one or more PSSCH 316 transmitting UEs need to avoid scheduling the PSSCHs 316 in. Additionally or alternatively, the sidelink UEs intending to transmit PSSCHs 316 may select slots 312 for PSSCH 316 transmission other than slots 312 that include TRS(s) 322. In some instances, when a sidelink UE transmits a PSSCH 316 in the same symbol as a TRS such as symbols 411(5) and 411(9), the sidelink UE may boost the power transmission level of the PSSCH 316 to match the power level of the TRS 322 to maintain a constant power level in the REs of the symbols 411(5) and 411(9) that include the PSSCH and TRS.

In some aspects the first sidelink UE may receive a communication in a slot 312 including a TRS(s) 322 and a PSSCH 316 from the second sidelink UE. The first sidelink UE may utilize the TRS(s) 322 received in the slot 312 to synchronize time and frequency with the second sidelink UE before decoding the PSSCH 316. In this manner, the time and frequency may be better synchronized with the second sidelink UE increasing the probability of successful decoding of the PSSCH 316 as compared to attempting to decode the PSSCH 316 before synchronizing the time and frequency with the second sidelink UE.

Figure 5:
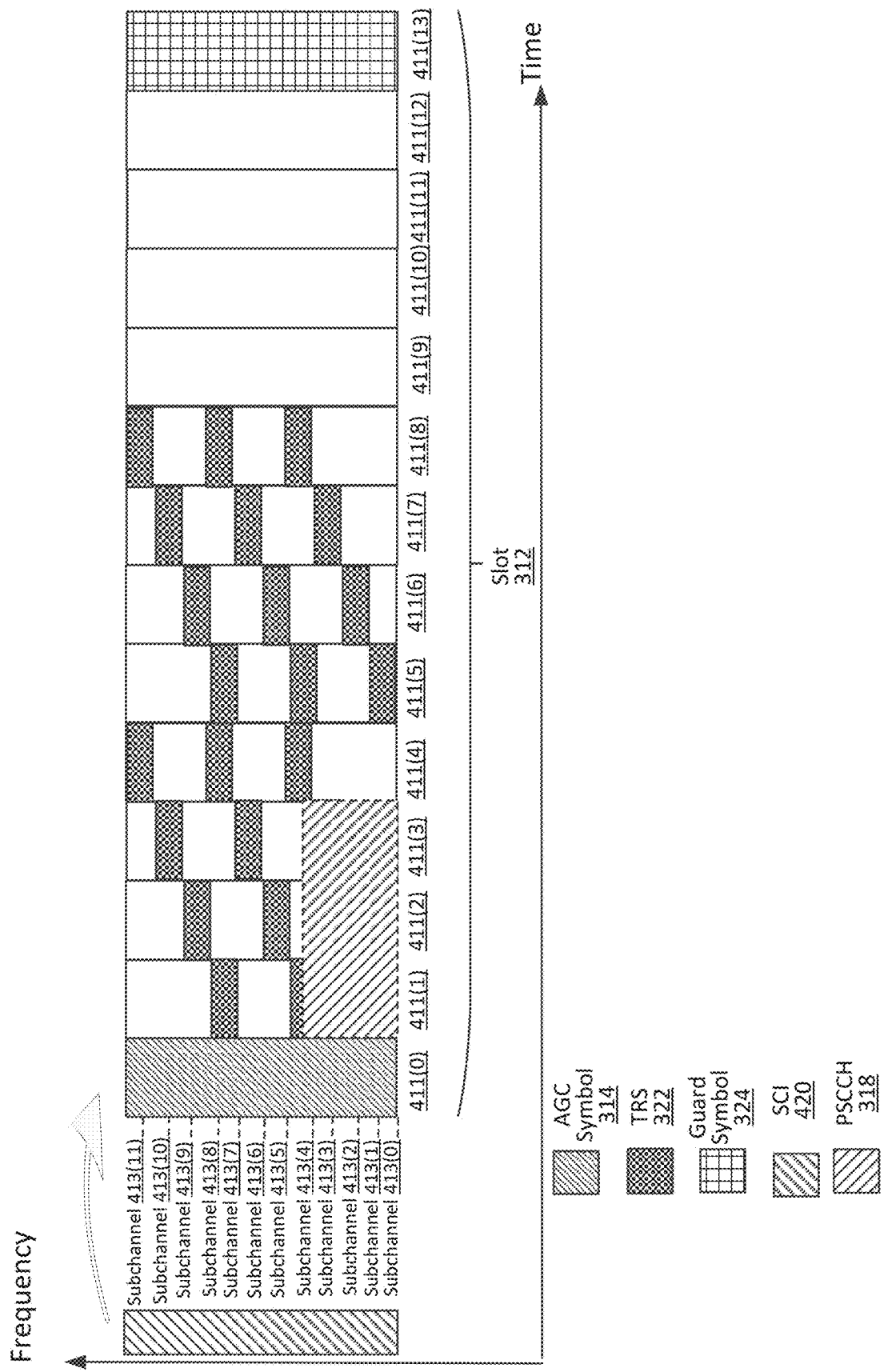

FIG. 5 illustrates tracking reference signal (TRS) 322 resources according to some aspects of the present disclosure. In FIG. 5, the x-axis represents time in some arbitrary units and the y-axis represents frequency in some arbitrary units. In some aspects, the first sidelink UE may receive the TRS 322 (e.g., a standalone TRS 322) from the second sidelink UE in a slot 312 that does not include a PSSCH. In this regard, the first sidelink UE may receive a communication from the second sidelink UE that includes an AGC symbol 315, a PSCCH 318, one or more TRSs 322, and a guard symbol 324. In some aspects, when multiple TRSs 322 are transmitted, the TRSs 322 may be transmitted in adjacent symbols 411. The adjacent symbols 411 may be contiguous with no gaps between the symbols 411. Any number of TRSs 322 may be transmitted within any symbol 411. Any number of symbols 411 may include TRSs 322. Additionally or alternatively, the first symbol, (e.g., symbol index 411(0)) may carry the AGC symbol 315, the next 2 or 3 symbols (e.g., symbol indexes 411(1) and 411(2) or symbol indexes 411(1), 411(2), and 411(3)) may carry a PSCCH 318, and the symbols 411 following the PSCCH 318 (e.g., symbol indexes 411(4)-411(13)) may carry the TRSs 322. The PSCCH 318 may carry SCI-1 and/or SCI-2. The first sidelink UE may decode the SCI-1 and/or the SCI-2. The SCI-1 and/or the SCI-2 may indicate (e.g., trigger) to the first sidelink UE that the symbols 411 after the PSCCH 318 may carry the TRSs 322. The SCI-1 and/or the SCI-2 may indicate, without limitation, the periodicity, the TRS transmission window, the group ID, the time/frequency resources associated with the TRS(s) transmitted to the first sidelink UE, the time/frequency resources associated with the TRS resource pool, and/or the symbol index 411(0)-411 (13) associated with the TRS(s).

In some aspects, the first sidelink UE may receive an indicator (e.g. a trigger) indicating the second sidelink UE is transmitting a TRS 322 to the first sidelink UE. The first sidelink UE may receive the indicator from the second sidelink UE via SCI (e.g., SCI-1 and/or SCI-2). The first sidelink UE may receive the TRSs 322 periodically based on the transmission periodicity of the TRS 322. In some aspects, the second sidelink UE may transmit the indicator multiple times. In some aspects, the second sidelink UE may transmit the indicator multiple times within a time period (e.g., within a number of slots 312). Transmitting the indicator multiple times may increase the probability that the first sidelink UE will receive the indicator. For example, if the first sidelink UE is a half-duplex sidelink UE, the first sidelink UE may be in transmit mode when the second sidelink UE transmits the indicator. By transmitting the indicator multiple times, the probability is increased that the half-duplex first sidelink UE will receive the indicator when the half-duplex first sidelink UE is in receive mode.

Additionally or alternatively, the first sidelink UE may receive the TRS(s) 322 (e.g., a standalone TRS) from the second sidelink UE in a slot 312 that does not include a PSSCH or a PSCCH 318. The first sidelink UE may receive the TRS(s) 322 from the second sidelink UE in a slot 312 that includes an AGC symbol 315, one or more TRS(s) 322, and a guard symbol 324. In some aspects, the TRS(s) 322 may be transmitted in adjacent symbols 411 that are contiguous with no gaps between the symbols 411. Any number of TRS(s) 322 may be transmitted within any symbol 411. Any number of symbols 411 may include TRS(s) 322. The first sidelink UE may receive a communication in a previous slot 312 that carries an SCI-1 and/or SCI-2. The SCI-1 and/or the SCI-2 in the previous slot 312 may indicate to the first sidelink UE that a subsequent slot 312 may carry the TRS(s) 322. The SCI-1 and/or the SCI-2 may indicate the symbol index 411(0)-411(13) that includes the TRS 322.

Figure 6:
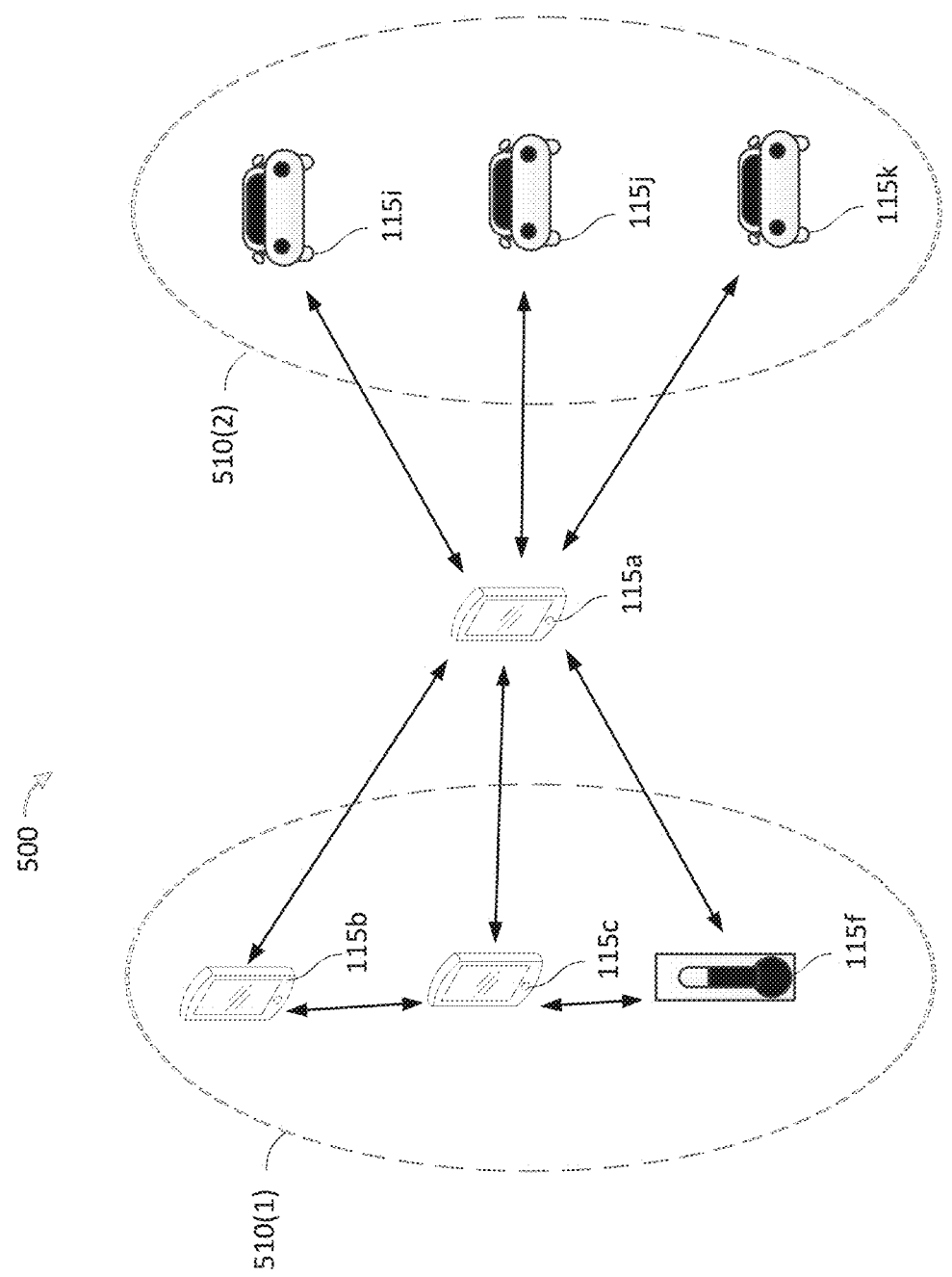
FIG. 6 illustrates sidelink UE groups according to some aspects of the present disclosure.

FIG. 6 illustrates a wireless communication network 600 according to some aspects of the present disclosure. The wireless communications network 600 may include sidelink UEs 115a, 115b, 115c, 115f, 115i, 115j, and 115k which may be examples of a UE 115 as described with reference to FIG. 1 or FIG. 2. The UE 115a may communicate via sidelink communication to the UEs 115b, 115c, 115f, 115i, 115j, and 115k.

In some aspects, the UE 115c may receive a TRS from the UE 115a that is intended for a plurality of sidelink UEs. The plurality of sidelink UEs may include the UE 115c. In this regard, the UE 115a may transmit the TRS in a groupcast communication. The groupcast communication may be intended for a group 610 of sidelink UEs to receive the TRS and synchronize time and/or frequency to the UE 115a. The second sidelink UE may transmit the TRS(s) to the group 610 of sidelink UEs at a constant power level. The constant power level may be determined by the largest path loss associated the group 610 of sidelink UEs so that the sidelink UE having the largest path loss (e.g., the sidelink UE in the group furthest away from the UE 115a) is able to receive the TRS(s). The UE 115a may conserve resources by transmitting the TRS in a groupcast communication as compared to transmitting the TRSs in unicast communications to each member of the group 610. The groupcast communication may include a group ID that identifies the group 610 of sidelink UEs to receive the TRS. In this regard, the UE 115c may receive (e.g., be assigned) a group ID associated with group 610(1) via SCI-2 (e.g., a codepoint in the SCI-2) in the groupcast communication or a unicast communication from the UE 115a. Additionally or alternatively, the UE 115c may receive (e.g., be assigned) a group ID associated with group 610(1) from a BS (e.g., the BS 105 or 1000) via RRC signaling. The UE 115c may determine that the groupcast ID associated with group 610(1) includes the UE 115c's ID. Based on the UE 115c determining that the groupcast ID associated with group 610(1) includes the UE 115c's ID, the UE 115c may receive the TRS from the UE 115a. The UE 115c may periodically receive the TRS based on whether the SCI-2 indicates a groupcast ID that includes the UE 115c's ID. The UE 115c may update time/frequency tracking loop with the UE 115a based on the TRS carried by the groupcast communication. The UE 115c may receive a TRS from multiple sidelink UEs and keep separate time/frequency tracking loops for each of the multiple sidelink UEs. For example, the UE 115c may receive a TRS from the UE 115b and/or the UE 115f in addition to the UE 115a.

In some aspects, the UE 115c may periodically receive the TRS from the UE 115a. In this regard, the UE 115c may receive an indicator of the TRS periodicity from the UE 115a via a PSSCH, a PSCCH, SCI, an RRC message, a MAC-CE message, or other suitable communication. Additionally or alternatively, the UE 115c may receive an indicator of the TRS periodicity from a BS (e.g., the BS 105 or 1000) via a PDCCH, a PDSCH, DCI, an RRC message, a MAC-CE message, or other suitable communication. The TRS periodicity may be based on a mobility associated with the UE 115c and/or the UE 115a. For example, the UE 115c and/or the UE 115a may be a stationary device (e.g., an IoT device) configured with a longer TRS periodicity as compared to a mobile UE (e.g., a vehicle or a smartphone) configured with a shorter TRS periodicity. A higher mobility device may be configured with a shorter TRS period in order to update the time/frequency synchronization at a higher frequency to compensate for a Doppler frequency shift. In some aspects, the sidelink UEs may receive TRSs at different periodicities based on the sidelink UE's mobility. For example, the UE 115a (e.g., the TRS TXer) may form groups 610 of sidelink UEs (e.g., the TRS RXers) based on the TRS RXers mobility. For example, the UE 115a (e.g., the TRS TXer) may form group 610(1) consisting of sidelink UEs 115b (e.g., a smartphone), 115c (e.g., a smartphone), and 115f (e.g., an IoT device) having a low mobility. The UE 115a (e.g., the TRS TXer) may form group 610(2) consisting of sidelink UEs 115i (e.g., a vehicle), 115j (e.g., a vehicle), and 115k (e.g., a vehicle) having a high mobility. The UE 115a may form any number of groups 610 based on the TRS RXers mobility. The UE 115a may assign a groupcast ID to each of the groups 610(1) and 610(2). Each of the groups 610(1) and 610(2) may have a different TRS periodicity. The UE 115a may groupcast the TRSs based on the periodicity assigned to each group 610(1) and 610(2).

Figure 7:
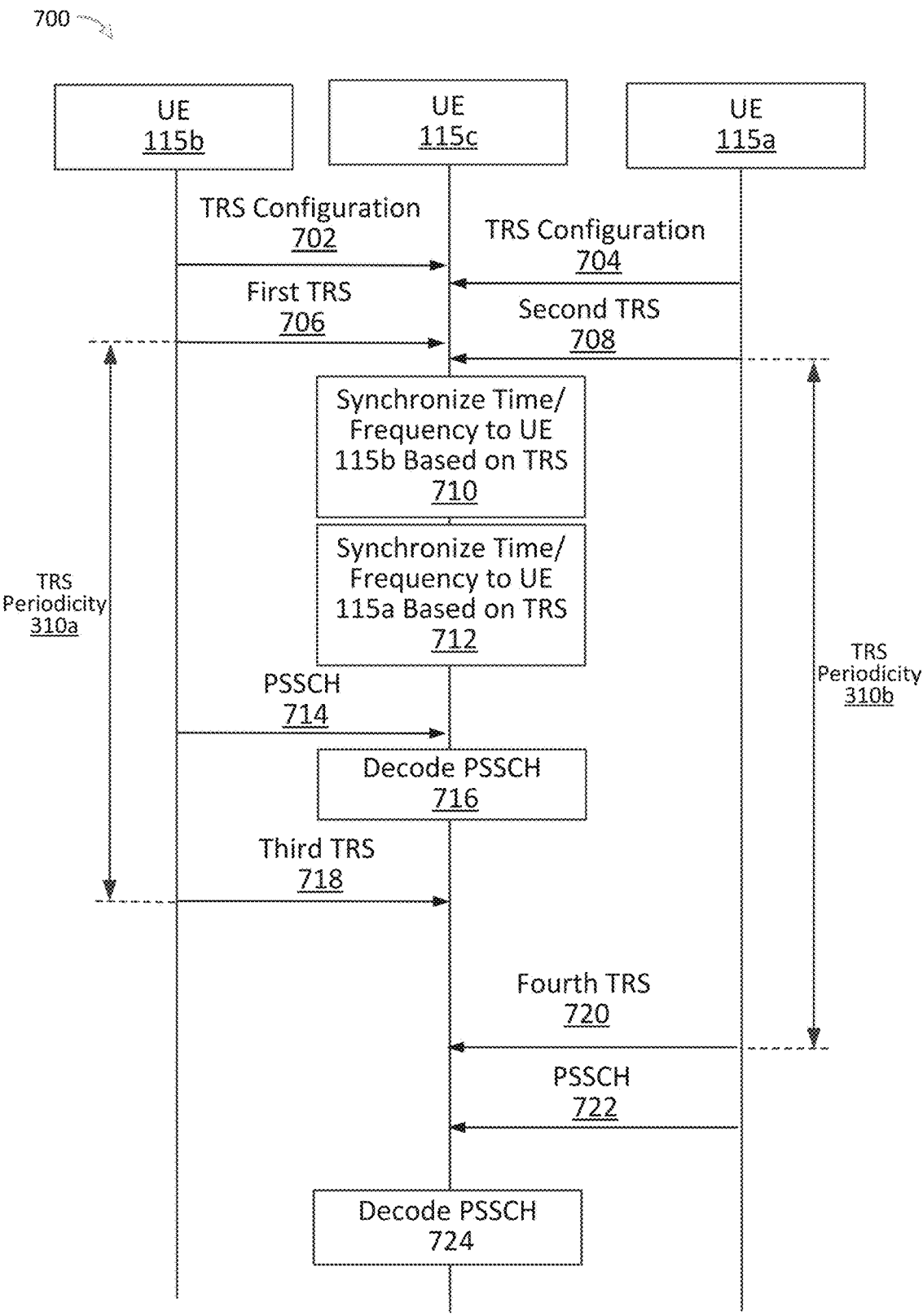
FIG. 7 is a signaling diagram of a wireless communication method according to some aspects of the present disclosure.

FIG. 7 is a signaling diagram of a communication method 700 according to some aspects of the present disclosure. Actions of the communication method 700 can be executed by a computing device (e.g., a processor, processing circuit, and/or other suitable component) of a communication device or other suitable means for performing the actions. For example, a wireless communication device, such as the UE 115 or UE 900, may utilize one or more components, such as the processor 902, the memory 904, the periodic TRS module 908, the transceiver 910, the modem 912, and the one or more antennas 916, to execute the aspects of method 700.

At action 702, the UE 115b may transmit a TRS configuration to the UE 115c. The UE 115b may transmit the TRS configuration to the UE 115c via SCI (e.g., SCI-1 and/or SCI-2), a PSSCH, a PSCCH, an RRC message, a MAC-CE message, or other suitable communication. The TRS configuration may include, without limitation, an indicator indicating a TRS periodicity, time/frequency resources associated with the TRS(s), a groupcast ID, a TRS window, a TRS window offset, a comb pattern, a comb pattern index, and/or a TRS suspension duration indicator.

At action 704, the UE 115a may transmit a TRS configuration to the UE 115c. The UE 115b may transmit the TRS configuration to the UE 115c via SCI (e.g., SCI-1 and/or SCI-2), a PSSCH, a PSCCH, an RRC message, a MAC-CE message, or other suitable communication. The TRS configuration may include, without limitation, an indicator indicating a TRS periodicity, time/frequency resources associated with the TRS(s), a groupcast ID, a TRS window, a TRS window offset, a comb pattern, a comb pattern index, and/or a TRS suspension duration indicator.

At action 706, the UE 115b may transmit a first TRS(s) to the UE 115c. The UE 115b may transmit the first TRS(s) to the UE 115c as described above with reference to FIGS. 3-6.

At action 708, the UE 115a may transmit a second TRS(s) to the UE 115c. The UE 115a may transmit the second TRS(s) to the UE 115c as described above with reference to FIGS. 3-6.

At action 710, the UE 115c may synchronize time and/or frequency with the UE 115b based on the first TRS(s) received at action 706. The TRS may assist the UE 115c to synchronize time and/or frequency tracking with the UE 115b and each of the sidelink UEs that the UE 115c receives TRSs from. The TRS may be a specific configuration of the CSI-RS. In some aspects, the TRS may be configured as a non-zero power (NZP) CSI-RS resource set. The TRS may allow the UE 115c to track frequency and time variations with a high resolution (e.g., enable fine tuning of time/frequency tracking). Improved time/frequency synchronization may benefit the performance of data transfer between the UE 115c and the UE 115b.

At action 712, the UE 115c may synchronize time and/or frequency with the UE 115a based on the second TRS(s) received at action 708. The TRS may assist the UE 115c to synchronize time and/or frequency tracking with the UE 115a.

At action 714, the UE 115b may transmit a PSSCH to the UE 115c. In this regard, the UE 115b may transmit a communication in a slot including a TRS (e.g., an additional TRS) and a PSSCH to the UE 115c.

At action 716, the UE 115c may decode the PSSCH. The UE 115c may utilize the TRSs received at action 706 to synchronize time and/or frequency with the UE 115b before decoding the PSSCH. In this manner, the time and/or frequency may be better synchronized between the UE 115b and the UE 115c increasing the probability of successful decoding of the PSSCH by the UE 115c as compared to decoding the PSSCH before synchronizing the time and/or frequency.

At action 718, the UE 115b may transmit a third TRS(s) to the UE 115c. In some aspects, the UE 115b may periodically transmit TRS(s) to the UE 115c based on the TRS periodicity (e.g., the TRS periodicity 310b) transmitted in the TRS configuration to the UE 115c at action 702. In this manner, the UE 115c may receive TRSs from the UE 115b on a regular basis, which can increase the accuracy of the time/frequency synchronization with the UE 115b. Each of the sidelink UEs transmitting the TRS(s) to the UE 115c may transmit the TRS(s) in the same slot or a different slot from the UE 115b. The UE 115a may synchronize time and frequency with each of the sidelink UEs that the UE 115c receives TRSs from. In some aspects, the UE 115c may synchronize time and frequency with a subset of the sidelink UEs that the UE 115c receives TRSs from. The UE 115c may update time/frequency tracking loops for each of the sidelink UEs and/or a subset of the sidelink UEs that it receives TRSs from.

At action 720, the UE 115a may transmit a fourth TRS(s) to the UE 115c. In some aspects, the UE 115a may periodically transmit TRS(s) to the UE 115c based on the TRS periodicity (e.g., the TRS periodicity 310a) transmitted in the TRS configuration to the UE 115c at action 704. The TRS periodicity 310a may be different from or the same as the TRS periodicity 310b. In this manner, the UE 115c may receive TRSs from the UE 115a on a regular basis, which can increase the accuracy of the time/frequency synchronization with the UE 115a.

At action 722, the UE 115a may transmit a PSSCH to the UE 115c. In this regard, the UE 115b may transmit a communication in a slot including a TRS (e.g., an additional TRS) and a PSSCH to the UE 115c.

At action 724, the UE 115c may decode the PSSCH. The UE 115c may utilize the TRSs received at action 706 and/or at action 720 to synchronize time and/or frequency with the UE 115a before decoding the PSSCH. In this manner, the time and/or frequency may be better synchronized between the UE 115a and the UE 115c increasing the probability of successful decoding of the PSSCH by the UE 115c as compared to decoding the PSSCH before synchronizing the time and/or frequency.

Figure 8:
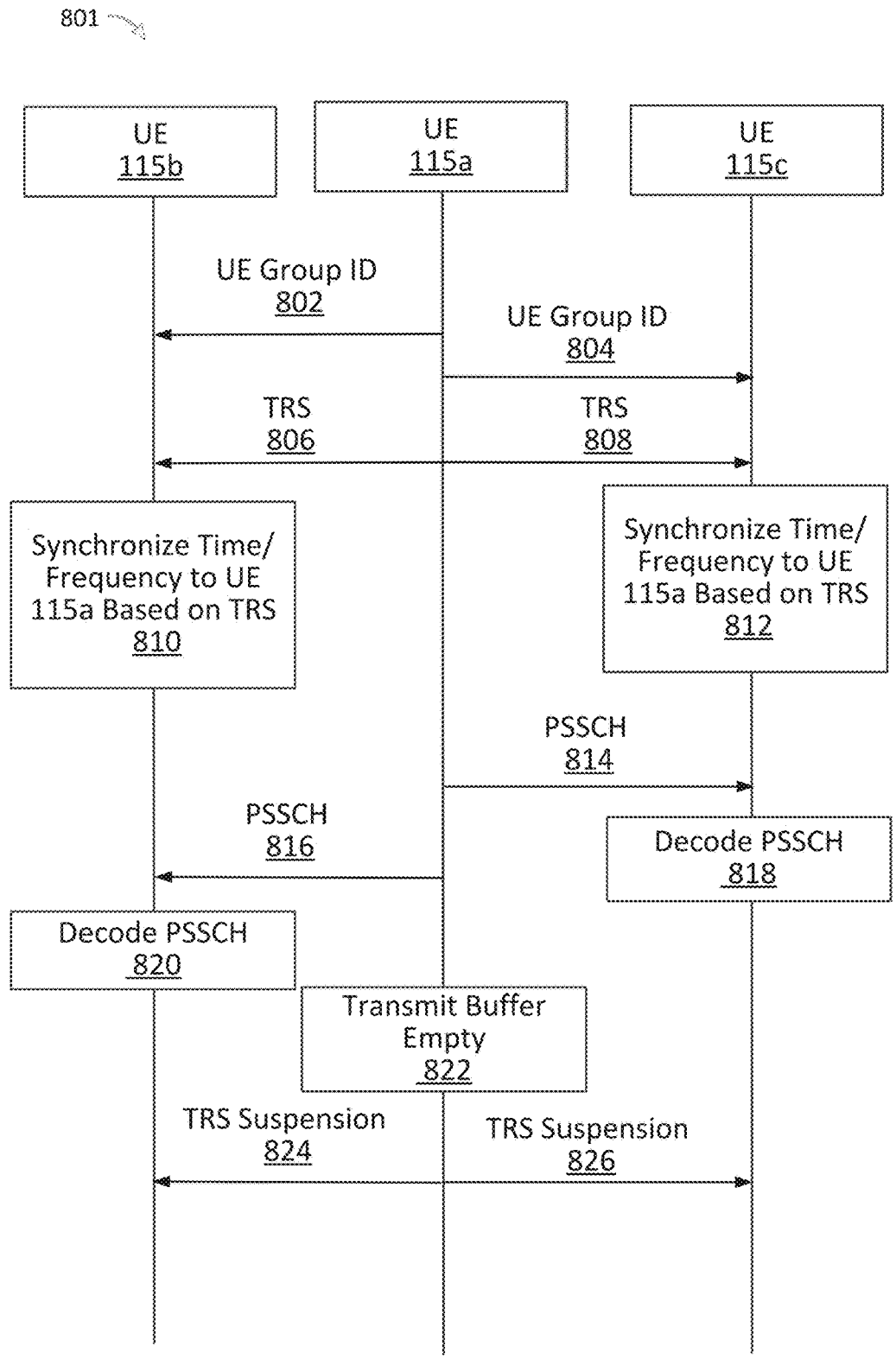
FIG. 8 is a signaling diagram of a wireless communication method according to some aspects of the present disclosure.

FIG. 8 is a signaling diagram of a communication method 800 according to some aspects of the present disclosure. Actions of the communication method 800 can be executed by a computing device (e.g., a processor, processing circuit, and/or other suitable component) of a communication device or other suitable means for performing the actions. For example, a wireless communication device, such as the UE 115 or UE 900, may utilize one or more components, such as the processor 902, the memory 904, the periodic TRS module 908, the transceiver 910, the modem 912, and the one or more antennas 916, to execute the aspects of communication method 800.

At action 802, the UE 115a may transmit a UE group ID to the UE 115b. In this regard, the UE 115a may transmit the UE group ID to the UE 115b via SCI (e.g., SCI-1 and/or SCI-2), a PSSCH, a PSCCH, an RRC message, a MAC-CE message, or other suitable communication.

At action 804, the UE 115a may transmit a UE group ID to the UE 115c. In this regard, the UE 115a may transmit the UE group ID to the UE 115c via SCI (e.g., SCI-1 and/or SCI-2), a PSSCH, a PSCCH, an RRC message, a MAC-CE message, or other suitable communication.

At action 806, the UE 115a may transmit a TRS to the UE 115b and the UE 115c. In this regard, the UE 115a may transmit a groupcast communication including a TRS. The UE 115a may transmit a TRS that is intended for a group of sidelink UEs. The group of sidelink UEs may include the UE 115b and the UE 115c. The groupcast communication may be intended for the UE 115b and the UE 115c to receive the TRS and synchronize time and/or frequency to the UE 115a. The UE 115a may conserve resources by transmitting the TRS in a groupcast communication as compared to transmitting the TRSs in separate unicast communications to the UE 115b and the UE 115c. The groupcast communication may include a group ID transmitted at actions 802 and 804 that identifies the UE 115b and/or the UE 115c to receive the TRS.

At action 810, the UE 115b may synchronize time and/or frequency to the UE 115a based on the TRS received at action 806. The UE 115b may determine that the groupcast ID includes the UE 115b's ID. Based on the UE 115b determining that the groupcast ID includes the UE 115b's ID, the UE 115b may synchronize time and/or frequency to the UE 115a based on the TRS. The UE 115b may periodically receive the TRS based on whether the SCI-2 indicates a groupcast ID that includes the UE 115b's ID.

At action 812, the UE 115c may synchronize time and/or frequency to the UE 115a based on the TRS received at action 806. The UE 115c may determine that the groupcast ID includes the UE 115c's ID. Based on the UE 115c determining that the groupcast ID includes the UE 115c's ID, the UE 115c may synchronize time and/or frequency to the UE 115a based on the TRS. The UE 115c may periodically receive the TRS based on whether the SCI-2 indicates a groupcast ID that includes the UE 115c's ID.

At action 814, the UE 115a may transmit a PSSCH to the UE 115c. In this regard, the UE 115a may transmit a communication in a slot including a TRS (e.g., an additional TRS) and a PSSCH to the UE 115c.

At action 816, the UE 115c may decode the PSSCH. The UE 115c may utilize the TRSs received at action 806 to synchronize time and/or frequency with the UE 115a before decoding the PSSCH. In this manner, the time and/or frequency may be better synchronized between the UE 115a and the UE 115c increasing the probability of successful decoding of the PSSCH by the UE 115c as compared to decoding the PSSCH before synchronizing the time and/or frequency.

At action 818, the UE 115a may transmit a PSSCH to the UE 115b. In this regard, the UE 115a may transmit a communication in a slot including a TRS (e.g., an additional TRS) and a PSSCH to the UE 115b.

At action 820, the UE 115b may decode the PSSCH. The UE 115b may utilize the TRSs received at action 806 to synchronize time and/or frequency with the UE 115a before decoding the PSSCH. In this manner, the time and/or frequency may be better synchronized between the UE 115a and the UE 115b increasing the probability of successful decoding of the PSSCH by the UE 115c as compared to decoding the PSSCH before synchronizing the time and/or frequency.

At action 822, the UE 115a may determine that its transmit buffer is empty. The UE 115a may suspend (e.g., temporarily discontinue) the periodic transmission of the TRS(s) to the UE 115b and/or the UE 115c. The UE 115a may suspend the periodic transmission of the TRS(s) to the UE 115b and/or the UE 115c based on a transmit buffer status associated with the UE 115a. For example, if the UE 115a (e.g., the TRS transmitter) has no data to transmit to the UE 115b and/or the UE 115c and/or is not expecting to transmit data to the UE 115b and/or the UE 115c during the next few TRS periods, the UE 115a may suspend transmission of the TRS(s) until the UE 115a has data to transmit to the UE 115b and/or the UE 115c. Suspending transmission of the periodic TRS(s) may conserve time/frequency resources in the wireless network and conserve processing/ power resources in the UE 115a, the UE 115b, and/or the UE 115c.

At action 824, the UE 115a may transmit a TRS suspension indicator to the UE 115b indicating that the periodic TRS transmission will be suspended.

At action 826, the UE 115a may transmit a TRS suspension indicator to the UE 115c indicating that the periodic TRS transmission will be suspended.

In some aspects, the UE 115a may transmit the TRS suspension indicator via SCI (e.g., SCI-1 and/or SCI-2). The TRS suspension indicator may include a duration of time of the TRS transmission suspension. The duration of time may be indicated by a number of TRS transmission periods, a number of slots, a number of frames, a set time (e.g., a number of milliseconds), or other suitable time duration. The time duration of TRS transmission suspension may be a preset (e.g., preconfigured) time duration and/or indicated in the TRS suspension indicator. In some aspects, when the time duration of TRS transmission suspension is preset, the UE 115a may resume TRS transmission without further indication to the UE 115a and/or UE 115c. In some aspects, the UE 115a may transmit an additional TRS suspension indicator before the time duration expires to extend the period of time of TRS transmission suspension. When the UE 115a has data to transmit after suspending the TRS transmission, the UE 115a may transmit an indicator indicating that the periodic TRS transmission will be resumed. In this regard, the UE 115a may transmit the TRS resumption indicator via SCI (e.g., SCI-1 and/or SCI-2). The UE 115a may transmit the resumed periodic TRS(s) in a TRS window of a slot indicated by SCI.

Figure 9:
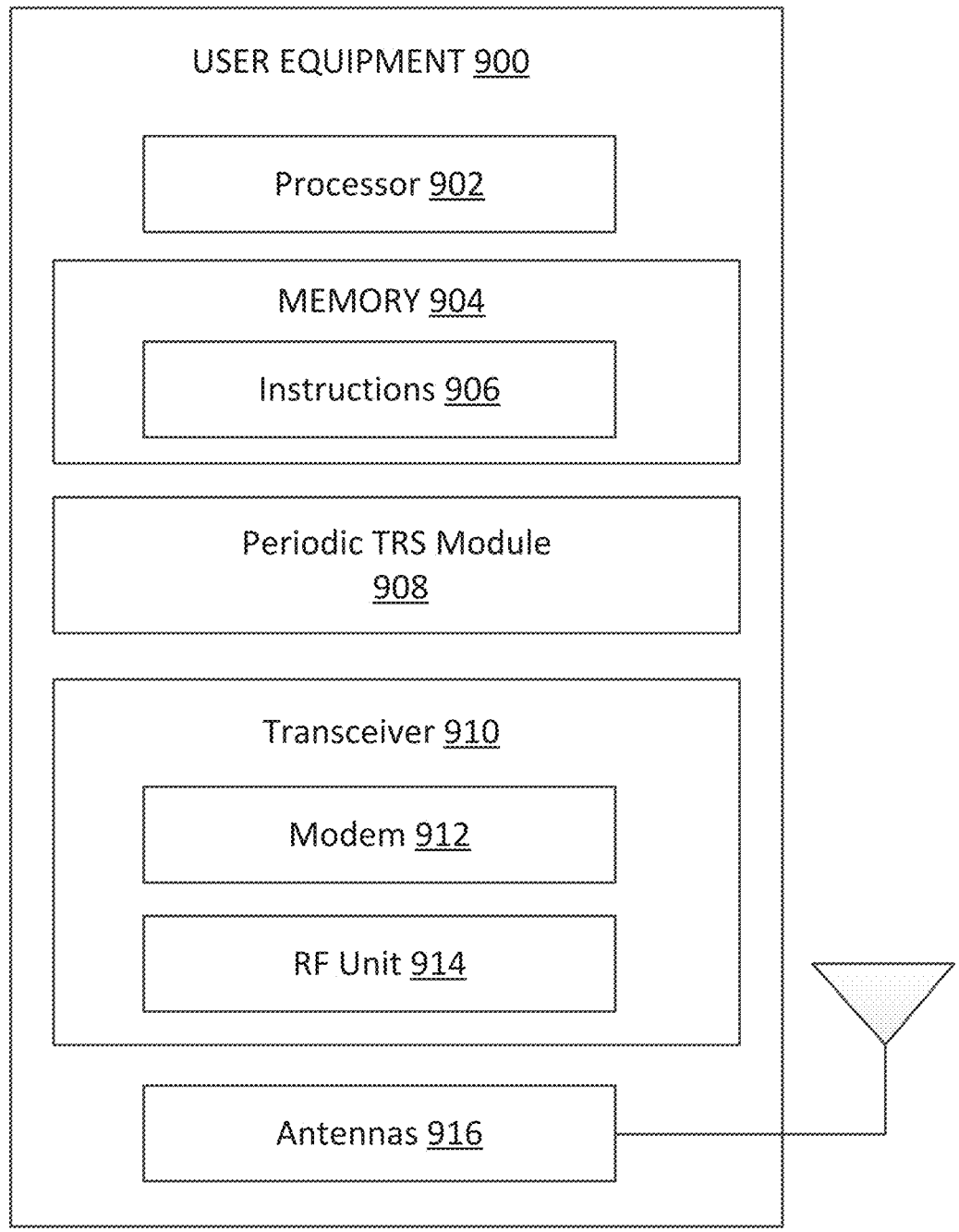
FIG. 9 is a block diagram of an exemplary user equipment (UE) according to some aspects of the present disclosure.

FIG. 9 is a block diagram of an exemplary UE 900 according to some aspects of the present disclosure. The UE 900 may be the UE 115 in the network 100 or 200 as discussed above. As shown, the UE 900 may include a processor 902, a memory 904, a periodic TRS module 908, transceiver 910 including a modem subsystem 912 and a radio frequency (RF) unit 914, and one or more antennas 916. These elements may be coupled with each other and in direct or indirect communication with each other, for example via one or more buses.

The processor 902 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some instances, the memory 904 includes a non-transitory computer-readable medium. The memory 904 may store instructions 906. The instructions 906 may include instructions that, when executed by the processor 902, cause the processor 902 to perform the operations described herein with reference to the UEs 115 in connection with aspects of the present disclosure, for example, aspects of FIGS. 2-8 and 11-12. Instructions 906 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The periodic TRS module 908 may be implemented via hardware, software, or combinations thereof. For example, the periodic TRS module 908 may be implemented as a processor, circuit, and/or instructions 906 stored in the memory 904 and executed by the processor 902.

In some aspects, the periodic TRS module 908 may be configured to receive an indicator indicating a tracking reference signal (TRS) periodicity from a second sidelink UE. The periodic TRS module 908 may be configured to receive a TRS based on the TRS periodicity. The periodic TRS module 908 may be configured to acquire time and frequency synchronization with the second sidelink UE based on the TRS and receive a PSSCH communication based on the time and frequency synchronization with the second sidelink UE.

As shown, the transceiver 910 may include the modem subsystem 912 and the RF unit 914. The transceiver 910 can be configured to communicate bi-directionally with other devices, such as the BSs 105 and/or the UEs 115. The modem subsystem 912 may be configured to modulate and/or encode the data from the memory 904 and the periodic TRS module 908 according to a modulation and coding scheme (MCS), e.g., a low-density parity check (LDPC) coding scheme, a turbo coding scheme, a convolutional coding scheme, a digital beamforming scheme, etc. The RF unit 914 may be configured to process (e.g., perform analog to digital conversion or digital to analog conversion, etc.) modulated/encoded data from the modem subsystem 912 (on outbound transmissions) or of transmissions originating from another source such as a UE 115 or a BS 105. The RF unit 914 may be further configured to perform analog beamforming in conjunction with the digital beamforming. Although shown as integrated together in transceiver 910, the modem subsystem 912 and the RF unit 914 may be separate devices that are coupled together to enable the UE 900 to communicate with other devices.

The RF unit 914 may provide the modulated and/or processed data, e.g. data packets (or, more generally, data messages that may contain one or more data packets and other information), to the antennas 916 for transmission to one or more other devices. The antennas 916 may further receive data messages transmitted from other devices. The antennas 916 may provide the received data messages for processing and/or demodulation at the transceiver 910. The antennas 916 may include multiple antennas of similar or different designs in order to sustain multiple transmission links. The RF unit 914 may configure the antennas 916.

In some instances, the UE 900 can include multiple transceivers 910 implementing different RATs (e.g., NR and LTE). In some instances, the UE 900 can include a single transceiver 910 implementing multiple RATs (e.g., NR and LTE). In some instances, the transceiver 910 can include various components, where different combinations of components can implement RATs.

In some aspects, the processor 902 may be coupled to the memory 904, the periodic TRS module 908, and/or the transceiver 910. The processor 902 and may execute operating system (OS) code stored in the memory 904 in order to control and/or coordinate operations of the periodic TRS module 908 and/or the transceiver 910. In some aspects, the processor 902 may be implemented as part of the periodic TRS module 908.

Figure 10:
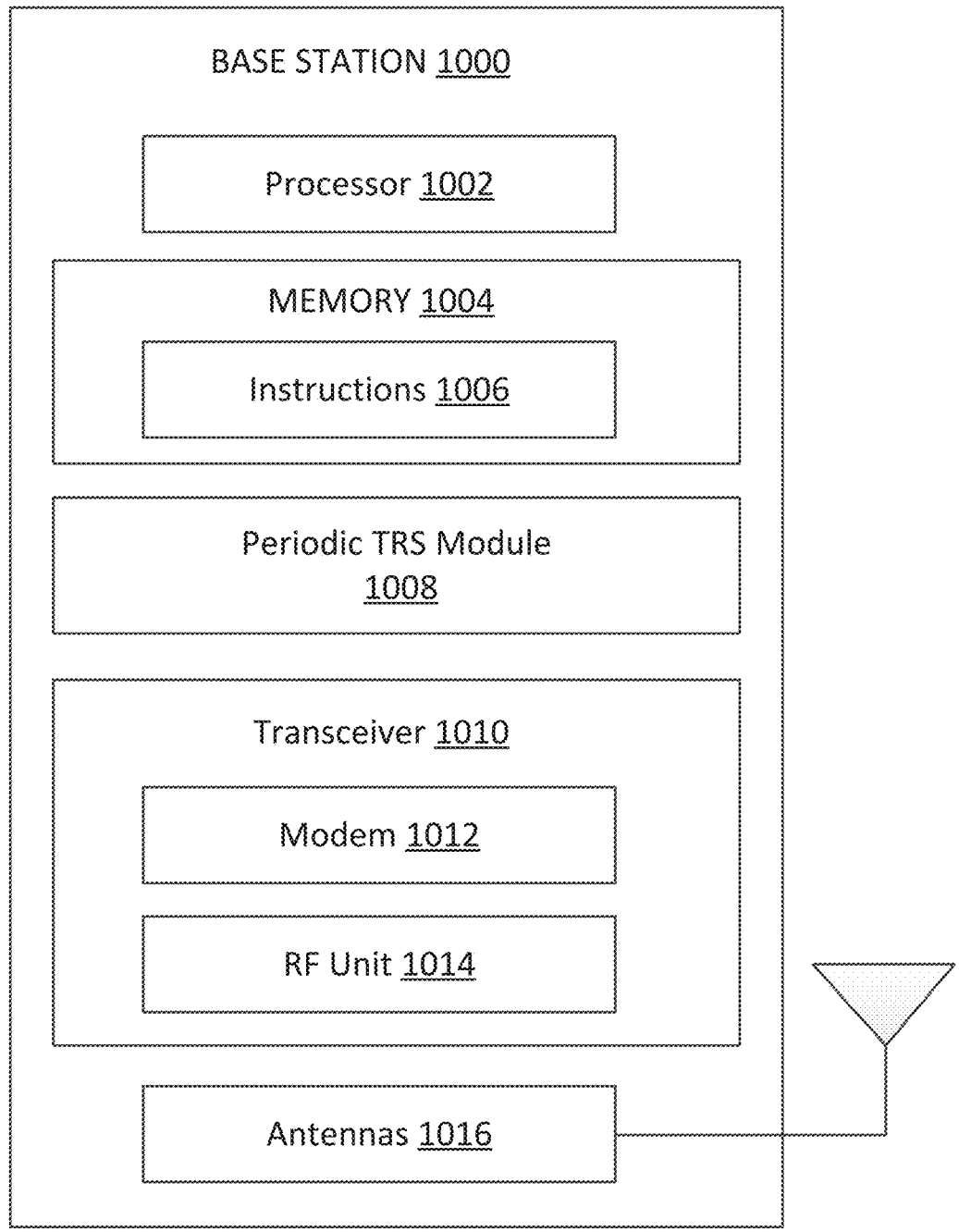
FIG. 10 is a block diagram of an exemplary base station (BS) according to some aspects of the present disclosure.

FIG. 10 is a block diagram of an exemplary BS 1000 according to some aspects of the present disclosure. The BS 1000 may be a BS 105 as discussed above. As shown, the BS 1000 may include a processor 1002, a memory 1004, an periodic TRS module 1008, a transceiver 1010 including a modem subsystem 1012 and a RF unit 1014, and one or more antennas 1016. These elements may be coupled with each other and in direct or indirect communication with each other, for example via one or more buses.

The processor 1002 may have various features as a specific-type processor. For example, these may include a CPU, a DSP, an ASIC, a controller, a FPGA device, another hardware device, a firmware device, or any combination thereof configured to perform the operations described herein. The processor 1002 may also be implemented as a combination of computing devices, e.g., a combination of a DSP and a microprocessor, a plurality of microprocessors, one or more microprocessors in conjunction with a DSP core, or any other such configuration.

The memory 1004 may include a cache memory (e.g., a cache memory of the processor 1002), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some instances, the memory 1004 may include a non-transitory computer-readable medium. The memory 1004 may store instructions 1006. The instructions 1006 may include instructions that, when executed by the processor 902, cause the processor 902 to perform operations described herein, for example, aspects of FIGS. 2-8 and 11-12. Instructions 1006 may also be referred to as code, which may be interpreted broadly to include any type of computer-readable statement(s).

The periodic TRS module 1008 may be implemented via hardware, software, or combinations thereof. For example, the periodic TRS module 1008 may be implemented as a processor, circuit, and/or instructions 1006 stored in the memory 1004 and executed by the processor 1002.

The periodic TRS module 1008 may be used for various aspects of the present disclosure, for example, aspects of FIGS. 2-8 and 11-12. In some aspects, the periodic TRS module 1008 may be configured to transmit an indicator indicating a tracking reference signal (TRS) periodicity to a second sidelink UE. The periodic TRS module 1008 may be configured to transmit a TRS to the second sidelink UE based on the TRS periodicity. The periodic TRS module 1008 may be configured to transmit, to the second sidelink UE synchronized in time and frequency with the first sidelink UE, a physical sidelink shared channel (PSSCH) communication.

Additionally or alternatively, the periodic TRS module 1008 can be implemented in any combination of hardware and software, and may, in some implementations, involve, for example, processor 1002, memory 1004, instructions 1006, transceiver 1010, and/or modem 1012.

As shown, the transceiver 1010 may include the modem subsystem 1012 and the RF unit 1014. The transceiver 1010 can be configured to communicate bi-directionally with other devices, such as the UEs 115 and/or 600. The modem subsystem 1012 may be configured to modulate and/or encode data according to a MCS, e.g., a LDPC coding scheme, a turbo coding scheme, a convolutional coding scheme, a digital beamforming scheme, etc. The RF unit 1014 may be configured to process (e.g., perform analog to digital conversion or digital to analog conversion, etc.) modulated/encoded data from the modem subsystem 1012 (on outbound transmissions) or of transmissions originating from another source such as a UE 115 or UE 900. The RF unit 1014 may be further configured to perform analog beamforming in conjunction with the digital beamforming. Although shown as integrated together in transceiver 1010, the modem subsystem 1012 and/or the RF unit 1014 may be separate devices that are coupled together at the BS 1000 to enable the BS 1000 to communicate with other devices.

The RF unit 1014 may provide the modulated and/or processed data, e.g. data packets (or, more generally, data messages that may contain one or more data packets and other information), to the antennas 1016 for transmission to one or more other devices. This may include, for example, a configuration indicating a plurality of sub-slots within a slot according to aspects of the present disclosure. The antennas 1016 may further receive data messages transmitted from other devices and provide the received data messages for processing and/or demodulation at the transceiver 1010. The antennas 1016 may include multiple antennas of similar or different designs in order to sustain multiple transmission links.

In some instances, the BS 1000 can include multiple transceivers 1010 implementing different RATs (e.g., NR and LTE). In some instances, the BS 1000 can include a single transceiver 1010 implementing multiple RATs (e.g., NR and LTE). In some instances, the transceiver 1010 can include various components, where different combinations of components can implement RATs.

In some aspects, the processor 1002 may be coupled to the memory 1004, the periodic TRS module 1008, and/or the transceiver 1010. The processor 1002 may execute OS code stored in the memory 1004 to control and/or coordinate operations of the periodic TRS module 1008, and/or the transceiver 1010. In some aspects, the processor 1002 may be implemented as part of the periodic TRS module 1008. In some aspects, the processor 1002 is configured to transmit via the transceiver 1010, to a UE, an indicator indicating a configuration of sub-slots within a slot.

Figure 11:
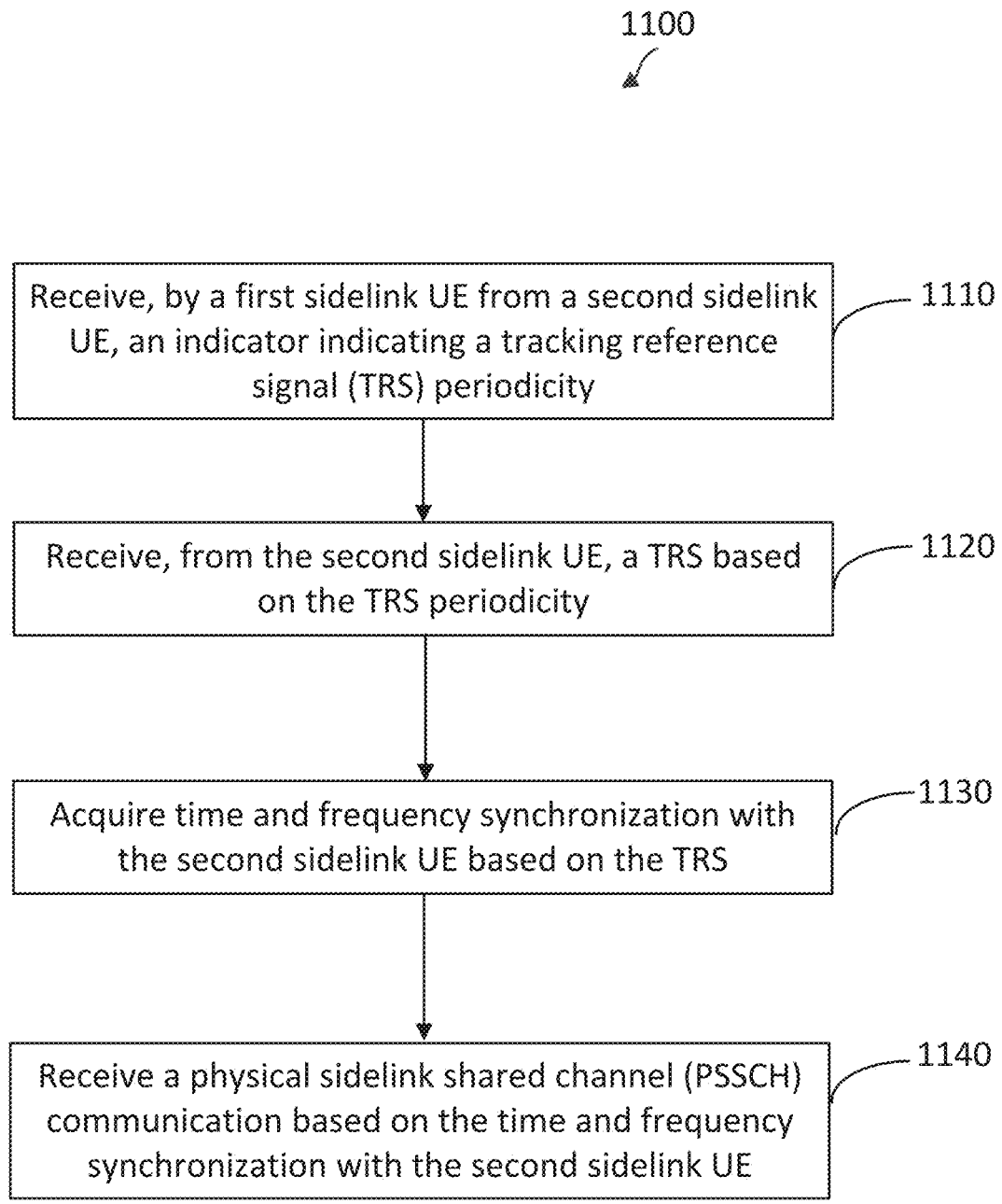
FIG. 11 is a flow diagram of a communication method according to some aspects of the present disclosure.

FIG. 11 is a flow diagram of a communication method 1100 according to some aspects of the present disclosure. Aspects of the method 1100 can be executed by a computing device (e.g., a processor, processing circuit, and/or other suitable component) of a wireless communication device or other suitable means for performing the aspects. For example, a wireless communication device, such as the UE 115 or UE 900, may utilize one or more components, such as the processor 902, the memory 904, the periodic TRS module 908, the transceiver 910, the modem 912, and the one or more antennas 916, to execute aspects of method 1100. The method 1100 may employ similar mechanisms as in the networks 100 and 200 and the aspects and actions described with respect to FIGS. 2-8. As illustrated, the method 1100 includes a number of enumerated aspects, but the method 1100 may include additional aspects before, after, and in between the enumerated aspects. In some aspects, one or more of the enumerated aspects may be omitted or performed in a different order.

At action 1110, the method 1100 includes a first sidelink UE (e.g., the UE 115 or the UE 900) receiving an indicator indicating a tracking reference signal (TRS) periodicity. The first sidelink UE may receive the indicator from a second sidelink UE. In some aspects, the first sidelink UE may periodically receive a TRS from the second sidelink UE based on the TRS periodicity. In this regard, the first sidelink UE may receive a TRS configuration including the indicator indicating the TRS periodicity. The first sidelink UE may receive the TRS configuration from the second sidelink UE via SCI (e.g., SCI-1 and/or SCI-2), a PSSCH, a PSCCH, an RRC message, a MAC-CE message, or other suitable communication. Additionally or alternatively, the first sidelink UE may receive an indicator of the TRS periodicity from a BS (e.g., the BS 105 or 1000) via a PDCCH, a PDSCH, DCI, an RRC message, a MAC-CE message, or other suitable communication.

The TRS periodicity may be based on a mobility associated with the first sidelink UE and/or the second sidelink UE. For example, the first sidelink UE and/or the second sidelink UE may be a stationary device (e.g., an IoT device such as a programmable logic controller (PLC) or roadside unit (RSU)) configured with a longer TRS period as compared to a mobile UE (e.g., a vehicle or a smartphone) configured with a shorter TRS period. A higher mobility device may be configured with a shorter TRS period in order to update the time/frequency synchronization at a higher frequency to compensate for a Doppler frequency shift and/or other changes associated with the device changing positions. In some aspects, the second sidelink UE may transmit TRS(s) at different periodicities based on the mobility of the first sidelink UE. In this regard, the first sidelink UE may transmit an indicator to the second UE indicating a mobility associated with the first sidelink UE. For example, the indicator may include a type (e.g., a class) of UE (e.g., a vehicle, a sensor, a PLC, a roadside unit) that indicates a mobility of the first sidelink UE. In some aspects, the first sidelink UE may transmit to the second sidelink UE an indication of the first sidelink UE's speed and/or direction. The first sidelink UE's speed and direction may be determined based on a GPS receiver, RF triangulation, or other suitable method. In some aspects, the second sidelink UE may transmit a new TRS periodicity to the first sidelink UE when the mobility of the first sidelink UE changes (e.g., mobility change of the first sidelink UE satisfies a threshold).

The TRS periodicity may indicate the times at which the first sidelink UE receives the TRS(s) from the second sidelink UE. The first UE may receive an indicator indicating a TRS window (e.g., a resource selection window). The TRS window may be a time period in which the first sidelink UE receives the TRS(s). The TRS window may be indicated in the communication, at action 1110, that includes the indicator indicating the TRS periodicity and/or the UE may receive the indicator indicating the TRS window in a separate communication. For example, the first sidelink UE may receive the indicator indicating the TRS window from the second sidelink UE via SCI (e.g., SCI-1 and/or SCI-2), a PSSCH, a PSCCH, an RRC message, a MAC-CE message, or other suitable communication. The TRS window may indicate a starting time and/or an ending time in which the first sidelink UE may receive the TRS(s). In this regard, the starting time may correspond to a first slot index and the ending time may correspond to a second slot index (e.g., the last slot in the TRS window). In some instances, the first sidelink UE may receive the TRS(s) in any slot between the first slot index and the second slot index defining the TRS window, including the slots associated with the first and second slot indexes. In this regard, the first sidelink UE may receive the symbol index indication in a time domain resource allocation (TDRA). The TDRA may be carried by SCI-1 via the PSCCH. The second sidelink UE may randomly select a slot within the TRS window for transmitting the TRS(s).

In some aspects, the first sidelink UE may receive an indicator indicating which slot in the TRS window the second sidelink UE will transmit the TRS(s). For example, the indicator may correspond to an offset from the beginning of the TRS window and/or a slot index. The slot index may be indicated in the communication at action 1110 that includes the indicator indicating the TRS periodicity and/or the indicator indicating the TRS window, and/or the first sidelink UE may receive the indicator indicating the slot index in a separate communication. For example, the first sidelink UE may receive the indicator indicating the slot index from the second sidelink UE via SCI (e.g., SCI-1 and/or SCI-2), a PSSCH, a PSCCH, an RRC message, a MAC-CE message, or other suitable communication. Different TRS transmitting UEs may select different offsets from the beginning of the TRS window in order to avoid resource collision among the sidelink UEs intending to transmit TRS(s). In some aspects, the second sidelink UE may select (e.g., randomly select) a different slot in the TRS window for each instance of periodic TRS transmission. In this case, the second sidelink UE may transmit the indicator of the selected TRS slot to the first sidelink UE before (e.g., x slots before) transmitting the TRS(s).

At action 1120, the method 1100 includes the first sidelink UE (e.g., the UE 115 or the UE 900) receiving a TRS from the second sidelink UE based on the TRS periodicity, the TRS window, and/or the slot index. In some aspects, the first sidelink UE may receive the TRS(s) in time/frequency resources of a slot indicated by the slot index. In this regard, the second sidelink UE may randomly select the time/frequency resources for transmitting the TRS(s). The first sidelink UE may receive the TRS(s) in a symbol of the slot after one or more symbols that include a physical sidelink control channel (PSCCH). The first sidelink UE may receive the TRS(s) in a symbol of the slot after the PSCCH to avoid puncturing the SCI-1 carried by the PSCCH. The first sidelink UE may receive one or more TRSs in the slot. For example, the first sidelink UE may receive multiple TRSs from multiple sidelink UEs including the second sidelink UE. In some instances, when the first sidelink UE receives multiple TRSs in a slot the TRSs may be separated by n number of symbols in a comb-n pattern. The multiple TRSs may be separated by one, two, three, four, or more symbols in a comb-n pattern (e.g., where n equals one, two, three, four, or more). The first sidelink UE may receive the multiple TRSs in symbols after a PSCCH symbol. In some aspects, the first sidelink UE may receive PSSCHs in symbols between the symbols in which the first sidelink UE receives the TRSs. For example, the first sidelink UE may receive the multiple TRSs in symbols 5 and 9 and receive the PSSCHs in symbols 6-8. In some aspects, the first sidelink UE may receive an indication from the second sidelink UE indicating the symbols (e.g., the symbol indexes) of the slot in which the TRSs will be received. In this regard, the first sidelink UE may receive the symbol index indication in a time domain resource allocation (TDRA). The TDRA may be carried by SCI-1 via the PSCCH.

In some aspects, the first sidelink UE may receive multiple TRSs in a slot where each TRS in the slot is separated by m number of frequency subchannels in a comb-m pattern. The multiple TRSs may be separated by one, two, three, four, or more subchannels in a comb-m pattern (e.g., where m equals one, two, three, four, or more). In some aspects, the first sidelink UE may receive an indication from the second sidelink UE indicating the subchannels in which the TRSs will be transmitted. In this regard, the first sidelink UE may receive the indication in a frequency domain resource allocation (FDRA). The FDRA may be carried by SCI-1 via a PSCCH. In some aspects, the time/frequency resources and/or the comb pattern may be indicated to the first sidelink UE as a pattern index by the second sidelink UE via SCI. In some instances, the pattern index may indicate a preconfigured combination of time/frequency resources and the comb pattern. The first sidelink UE may receive the TRS(s) from the second sidelink UE in corresponding time/frequency resources of periodic slots. In other words, each of the periodic slots that include the TRS(s) from the second sidelink UE may include the TRS(s) in the same symbol indexes and/or the same frequency subchannels.

The first sidelink UE may receive multiple TRSs in symbols following the PSCCH where each TRS in the slot is separated by m number of frequency subchannels in a comb-m pattern. The multiple TRSs may be separated by one, two, three, four, or more subchannels in a comb-m pattern (e.g., where m equals one, two, three, four, or more). Each of the TRSs may be transmitted in the same or different frequency subchannel(s). For example, a first TRS may be transmitted in a first subchannel (e.g., subchannel index 0), a second TRS may be transmitted in a second subchannel (e.g., subchannel index 0+x), a third TRS may be transmitted in a third subchannel (e.g., subchannel index 0+2x), etc. Each of the subchannels may be separated by x number of subchannels. The first sidelink UE may receive the TRS configuration from the second sidelink UE indicating the time/frequency resources associated with the TRSs. In some aspects, the first sidelink UE may receive an indication in a TDRA from the second sidelink UE indicating the symbols in which the TRSs will be transmitted. The TDRA may be carried by SCI (e.g., SCI-1 and/or SCI-2) via the PSCCH. In some aspects, the first sidelink UE may receive an indication in a FDRA from the second sidelink UE indicating the subchannels in which the TRSs will be transmitted. The FDRA may be carried by SCI (e.g., SCI-1 and/or SCI-2) via the PSCCH.

In some aspects, the first sidelink UE may receive the TRS(s) from the second sidelink UE in a slot that includes a PSSCH. The slot may include an indicator (e.g., a trigger) in the SCI-1 and/or the SCI-2 that indicates to the first sidelink UE that the slot includes the TRS(s) and/or the PSSCH. Before decoding the SCI-2, the first sidelink UE may not know that the slot includes a TRS. The SCI-2 may have a common configuration among the sidelink UEs, including the first sidelink UE, such that the sidelink UEs may decode the SCI-2 from each sidelink UE that is transmitting a TRS. The TRSs may be transmitted in symbols after the symbols that include the SCI-2. The TRSs may be transmitted in symbols that do not include a DMRS to avoid collision with the DMRS. The first sidelink UE may decode the SCI-2 to determine if the PSSCH is intended for the first sidelink UE by matching the UE destination ID in the SCI-2 with the ID associated with the first sidelink UE. The TRS(s) may be carried by symbols different from the symbols carrying the PSSCH enabling the transmit power associated with the TRS(s) to remain constant.

In some aspects, the first sidelink UE may receive the TRS(s) in time/frequency resources of a dedicated resource pool. The dedicated resource pool may reserve slots exclusively for periodic transmission of TRSs. The transmission of PSSCHs may be excluded from the resources of the dedicated resource pool. The resources of a dedicated resource pool may be determined and/or set by the second sidelink UE transmitting the TRS(s), another sidelink UE transmitting TRS(s) (e.g., a high-end sidelink UE such as a programmable logic controller or roadside unit), a BS (e.g., the BS 105 or 1000), or other suitable device. The sidelink UEs intending to transmit PSSCHs may receive an indication of the resources associated with the dedicated resource pool and avoid scheduling PSSCH transmissions in those resources. The sidelink UEs intending to transmit PSSCHs may receive the indication of the resources of the dedicated resource pool via SCI-1, SCI-2, or other suitable communication. The sidelink UEs intending to transmit TRS(s) in the dedicated resource pool (e.g., reserved periodic slots) may select (e.g., randomly select) resources from the dedicated resource pool. For example, the second sidelink UE may select contiguous symbol indexes 4-7 and frequency comb index 0 in the reserved periodic slot while another sidelink UE may select contiguous symbol indexes 8-11 and frequency comb index 1 in the reserved periodic slot. Each of the sidelink UEs intending to transmit TRS(s) may receive the indication of the dedicated resource pool and the resources selected by other TRS transmitting UEs in order to avoid selecting resources previously selected by the other TRS transmitting UEs.

In some aspects, one or more sidelink UEs may transmit PSSCHs in the same slot as the TRS(s) transmitted by the second sidelink UE. In this case, the one or more sidelink UEs intending to transmit PSSCHs may rate match around the resource elements scheduled to carry the TRS(s) transmitted by the second sidelink UE and other sidelink UEs. The one or more UEs may schedule the transmission of the PSSCHs in resource elements other than the REs used to carry the TRS(s) to avoid interfering with the TRS(s). In some instances, the one or more sidelink UEs may determine the TRS rate match patterns by receiving SCI from the sidelink UEs that are scheduling the TRS(s). The SCI transmitted by the sidelink UEs that are scheduling the TRS(s) may indicate the REs (e.g., a TRS resource pattern field) in the slot that the one or more PSSCH transmitting UEs need to avoid scheduling the PSSCHs in. Additionally or alternatively, the sidelink UEs intending to transmit PSSCHs may select slots for PSSCH transmission other than slots that include TRS(s). In some instances, when a sidelink UE transmits a PSSCH in the same symbol as a TRS, the sidelink UE may boost the power transmission level of the PSSCH to match the power level of the TRS to maintain a constant power level in the REs of the symbol that include the PSSCH and TRS.

In some aspects, the first sidelink UE may periodically receive TRS(s) from sidelink UEs, including the second sidelink UE, based on the periodicity. In this manner, the first sidelink UE may receive TRSs from multiple sidelink UEs on a regular basis, which can increase the accuracy of the time/frequency synchronization with the TRS transmitting sidelink UEs. Each of the sidelink UEs transmitting the TRS(s) to the first sidelink UE may transmit the TRS(s) in the same slot or a different slot from the second sidelink UE. The first sidelink UE may synchronize time and frequency with each of the sidelink UEs that the first sidelink UE receives TRSs from. In some aspects, the first sidelink UE may synchronize time and frequency with a subset of the sidelink UEs that the first sidelink UE receives TRSs from. The first sidelink UE may update time/frequency tracking loops for each of the sidelink UEs and/or a subset of the sidelink UEs that it receives TRSs from.

The first sidelink UE may receive a PSSCH in a slot different from the slot(s) that the first sidelink UE receives the TRS(s) in. The slot that the first sidelink UE receives the PSSCH in may not include a TRS(s). The first sidelink UE may receive the PSSCH based on updating time/frequency tracking loops with the second sidelink UE (or other sidelink UE) based on TRS(s) received in a slot previous to the slot that includes the PSSCH.

In some aspects, the first sidelink UE may receive a TRS that is intended for a plurality (e.g., a group) of sidelink UEs. The group of sidelink UEs may include the first sidelink UE. For example, the second sidelink UE may transmit the TRS in a groupcast communication. The groupcast communication may be intended for a group of sidelink UEs to receive the TRS and synchronize time and frequency to the second sidelink UE. The second sidelink UE may transmit the TRS(s) to the group at a constant power level. The constant power level may be determined by the largest path loss associated the group of sidelink UEs so that the sidelink UE having the largest path loss (e.g., the sidelink UE in the group furthest away from the second sidelink UE) is able to receive the TRS(s). The second sidelink UE may conserve resources by transmitting the TRS in a groupcast communication as compared to transmitting the TRSs in unicast communications to each member of the group. The groupcast communication may include a group ID that identifies the group of sidelink UEs to receive the TRS. In this regard, the first sidelink UE may receive (e.g., be assigned) a group ID via SCI-1 and/or SCI-2 (e.g., a codepoint in the SCI-1 and/or SCI-2) in the groupcast communication or a unicast communication from the second sidelink UE. If the SCI-1 includes the groupcast ID and the TRS configuration, the slot may include a PSCCH to carry the SCI-1 and exclude the PSSCH. If the SCI-2 includes the groupcast ID and the TRS configuration, the slot may include a PSSCH to carry the SCI-2 and exclude the PSCCH Additionally or alternatively, the first sidelink UE may receive (e.g., be assigned) a group ID from a BS (e.g., the BS 105 or 1000) via RRC signaling. The first sidelink UE may determine that the groupcast ID includes the first sidelink UE's ID. Based on the first sidelink UE determining that the groupcast ID includes the first sidelink UE's ID, the first sidelink UE may receive the TRS(s). The first sidelink UE may periodically receive the TRS(s) based on whether the SCI-1 and/or SCI-2 indicates a groupcast ID that includes the first sidelink UE's ID. The first sidelink UE may update time/frequency tracking loop with the second sidelink UE based on the TRS(s) carried by the groupcast communication.

In some aspects, the first sidelink UE may receive the TRS (e.g., a standalone TRS) from the second sidelink UE in a slot that does not include a PSSCH. In this regard, the first sidelink UE may receive a communication from the second sidelink UE that includes an AGC symbol, a PSCCH, one or more TRSs, and a guard symbol. In some aspects, when multiple TRSs are transmitted, the TRSs may be transmitted in adjacent symbols. The adjacent symbols may be contiguous with no gaps between the symbols. Any number of TRSs may be transmitted within any symbol. Any number of symbols may include TRSs. Additionally or alternatively, the first symbol, (e.g., symbol index 0) may carry the AGC, the next 2 or 3 symbols (e.g., symbol indexes 1 and 2 or symbol indexes 1, 2, and 3) may carry a PSCCH, and the symbols following the PSCCH (e.g., symbol indexes 4-13) may carry the TRSs. The PSCCH may carry SCI-1 and/or SCI-2. The first sidelink UE may decode the SCI-1 and/or the SCI-2. The SCI-1 and/or the SCI-2 may indicate (e.g., trigger) to the first sidelink UE that the symbols after the PSCCH may carry the TRSs. The SCI-1 and/or the SCI-2 may indicate, without limitation, the periodicity, the TRS transmission window, the group ID, the time/frequency resources associated with the TRS(s) transmitted to the first sidelink UE, the time/frequency resources associated with the TRS resource pool, and/or the slot index associated with the TRS(s).

In some aspects, the first sidelink UE may receive an indicator (e.g. a trigger) indicating the second sidelink UE is transmitting a TRS to the first sidelink UE. The first sidelink UE may receive the indicator from the second sidelink UE via SCI (e.g., SCI-1 and/or SCI-2). The first sidelink UE may receive the TRSs periodically based on the indicator indicating the transmission periodicity of the TRS. In some aspects, the second sidelink UE may transmit the indicator multiple times. In some aspects, the second sidelink UE may transmit the indicator multiple times within a time period (e.g., within a number of slots). Transmitting the indicator multiple times may increase the probability that the first sidelink UE will receive the indicator. For example, if the first sidelink UE is a half-duplex sidelink UE, the first sidelink UE may be in transmit mode when the second sidelink UE transmits the indicator. By transmitting the indicator multiple times, the probability is increased that the half-duplex first sidelink UE will receive the indicator when the half-duplex first sidelink UE is in receive mode.

In some aspects the first sidelink UE may receive a communication including a TRS from the second sidelink UE in a slot that does not include a PSSCH before (e.g., immediately before) receiving a communication from the second sidelink UE that does include a PSSCH. The first sidelink UE may receive the TRS in a slot without a PSSCH before receiving a communication in a slot with a PSSCH in order to synchronize time and frequency (e.g., perform time/frequency compensation) with the second sidelink UE before decoding the PSSCH. In this manner, the time and frequency may be better synchronized with the second sidelink UE increasing the probability of successful decoding of the PSSCH as compared to receiving the TRS in a slot after the PSSCH.

In some aspects the first sidelink UE may receive a communication in a slot including a TRS(s) and a PSSCH from the second sidelink UE. The first sidelink UE may utilize the TRS(s) received in the slot to synchronize time and frequency with the second sidelink UE before decoding the PSSCH. In this manner, the time and frequency may be better synchronized with the second sidelink UE increasing the probability of successful decoding of the PSSCH as compared to attempting to decode the PSSCH before synchronizing the time and frequency with the second sidelink UE.

Additionally or alternatively, the first sidelink UE may receive the TRS(s) (e.g., a standalone TRS) from the second sidelink UE in a slot that does not include a PSSCH or a PSCCH. The first sidelink UE may receive the TRS(s) from the second sidelink UE in a slot that includes an AGC symbol, one or more TRS(s), and a guard symbol. In some aspects, the TRS(s) may be transmitted in adjacent symbols that are contiguous with no gaps between the symbols. Any number of TRS(s) may be transmitted within any symbol. Any number of symbols may include TRS(s). The first sidelink UE may receive a communication in a previous slot that carries an SCI-1 and/or SCI-2. The SCI-1 and/or the SCI-2 in the previous slot may indicate to the first sidelink UE that a subsequent slot may carry the TRS(s). The SCI-1 and/or the SCI-2 may indicate an index associated with the slot that includes the TRS.

In some aspects, the second sidelink UE may suspend (e.g., temporarily discontinue) the periodic transmission of the TRS(s) to the first UE. The second sidelink UE may suspend the periodic transmission of the TRS(s) to the first UE based on a transmit buffer status associated with the second UE. For example, if the second sidelink UE (e.g., the TRS transmitter) has no data to transmit to the first sidelink UE or other sidelink UEs and/or is not expecting to transmit data to the first sidelink UE or other sidelink UEs during the next few TRS periods, the second sidelink UE may suspend transmission of the TRS(s) until the second sidelink UE has data to transmit to the first sidelink UE or another sidelink UE. Suspending transmission of the periodic TRS(s) may conserve time/frequency resources in the wireless network and conserve processing/power resources in the first sidelink UE and/or the second sidelink UE. The first sidelink UE may receive an indicator from the second sidelink UE indicating that the periodic TRS transmission will be suspended. In this regard, the first sidelink UE may receive the TRS suspension indicator from the second sidelink UE in SCI (e.g., SCI-1 and/or SCI-2). The TRS suspension indicator may include a duration of time of the TRS transmission suspension. The duration of time may be indicated by a number of TRS transmission periods, a number of slots, a number of frames, a set time (e.g., a number of milliseconds), or other suitable time duration. The time duration of TRS transmission suspension may be a preset (e.g., preconfigured) time duration and/or indicated in the TRS suspension indicator. In some aspects, when the time duration of TRS transmission suspension is preset, the second sidelink UE may resume TRS transmission without further indication to the first sidelink UE. In some aspects, the second sidelink UE may transmit an additional TRS suspension indicator before the time duration expires to extend the period of time of TRS transmission suspension. When the second sidelink UE has data to transmit after suspending the TRS transmission, first sidelink UE may receive an indicator from the second sidelink UE indicating that the periodic TRS transmission will be resumed. In this regard, the first sidelink UE may receive the TRS resumption indicator from the second sidelink UE in SCI (e.g., SCI-1 and/or SCI-2). The first sidelink UE may receive the resumed periodic TRS(s) in a TRS window of a slot indicated by SCI. The first sidelink UE may acquire time and frequency synchronization with the second sidelink UE based on the TRS(S) and receive the data via a PSSCH in a subsequent slot. Additionally or alternatively, the first sidelink UE may receive the resumed periodic TRS(s) in a TRS window of a slot indicated by SCI, acquire frequency synchronization with the second sidelink UE based on the TRS(s), and receive the data via a PSSCH in the same slot as the TRS(s).

At action 1130, the method 1100 includes the first sidelink UE (e.g., the UE 115 or the UE 900) acquiring time and frequency synchronization with the second sidelink UE based on the TRS(s) received at action 1120. The TRS(s) may assist the first sidelink UE to synchronize time and frequency tracking with the second sidelink UE and each of the sidelink UEs that the first sidelink UE receives TRSs from. The TRS(s) may be a specific configuration of the CSI-RS. In some aspects, the TRS(s) may be configured as a non-zero power (NZP) CSI-RS resource set. The TRS(s) may allow the first sidelink UE to track frequency and time variations with a high resolution (e.g., enable fine tuning of time/frequency tracking). The first sidelink UE may use a combination of periodic TRS(s) across multiple slots (e.g., a number of previous slots that include the TRS(s)) to acquire time and frequency synchronization with the second sidelink UE. Improved time/frequency synchronization may benefit the performance of data transfer between the first sidelink UE and the sidelink UE.

At action 1140, the method 1100 includes the first sidelink UE (e.g., the UE 115 or the UE 900) receiving a PSSCH communication. The first sidelink UE may receive the PSSCH communication based on the acquired time and frequency synchronization with the second sidelink UE at action 1130. The first sidelink UE may receive the PSSCH in the same slot as the TRS(s) and/or in a slot following the slot(s) that includes the periodic TRS(s). In some instances, the first sidelink UE may receive the PSSCH in a slot immediately following a slot that includes a periodic TRS. In some instances, the first sidelink UE may receive the PSSCH in a slot following a slot that includes a periodic TRS that is separated from the slot including the periodic TRS by one or more slots. The first sidelink UE may utilize the TRSs received in the same slot as the PSSCH and/or in prior slots that include the TRS(s) to synchronize time and frequency with the second sidelink UE before decoding the PSSCH. In this manner, the time and frequency may be better synchronized with the second sidelink UE increasing the probability of successful decoding of the PSSCH as compared to the first sidelink UE attempting to decode the PSSCH before synchronizing time and frequency with the second sidelink UE.

Figure 12:
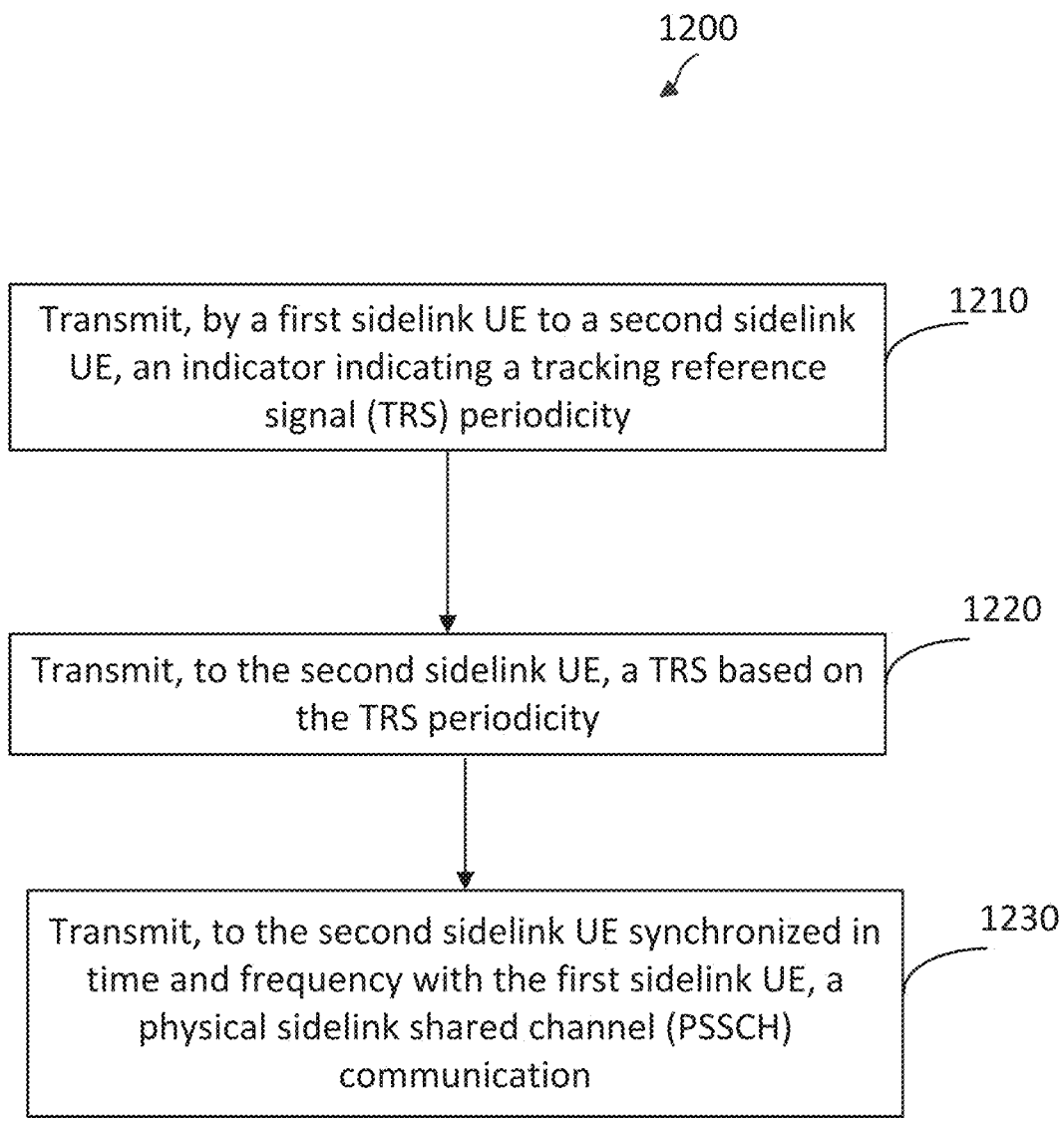
FIG. 12 is a flow diagram of a communication method according to some aspects of the present disclosure.

FIG. 12 is a flow diagram of a communication method 1200 according to some aspects of the present disclosure. Aspects of the method 1200 can be executed by a computing device (e.g., a processor, processing circuit, and/or other suitable component) of a wireless communication device or other suitable means for performing the aspects. For example, a wireless communication device, such as the UE 115 or UE 900, may utilize one or more components, such as the processor 902, the memory 904, the periodic TRS module 908, the transceiver 910, the modem 912, and the one or more antennas 916, to execute aspects of method 1200. The method 1200 may employ similar mechanisms as in the networks 100 and 200 and the aspects and actions described with respect to FIGS. 2-8. As illustrated, the method 1200 includes a number of enumerated aspects, but the method 1200 may include additional aspects before, after, and in between the enumerated aspects. In some aspects, one or more of the enumerated aspects may be omitted or performed in a different order.

At action 1210, the method 1200 includes a first sidelink UE (e.g., the UE 115 or the UE 900) transmitting an indicator indicating a tracking reference signal (TRS) periodicity. The first sidelink UE may transmit the indicator to a second sidelink UE. In some aspects, the first sidelink UE may periodically transmit a TRS to the second sidelink UE based on the TRS periodicity. In this regard, the first sidelink UE may transmit a TRS configuration including the indicator indicating the TRS periodicity. The first sidelink UE may transmit the TRS configuration to the second sidelink UE via SCI (e.g., SCI-1 and/or SCI-2), a PSSCH, a PSCCH, an RRC message, a MAC-CE message, or other suitable communication. Additionally or alternatively, the second sidelink UE may receive an indicator of the TRS periodicity from a BS (e.g., the BS 105 or 1000) via a PDCCH, a PDSCH, DCI, an RRC message, a MAC-CE message, or other suitable communication.

The TRS periodicity may be based on a mobility associated with the first sidelink UE and/or the second sidelink UE. For example, the first sidelink UE and/or the second sidelink UE may be a stationary device (e.g., an IoT device such as a programmable logic controller (PLC) or roadside unit (RSU)) configured with a longer TRS period as compared to a mobile UE (e.g., a vehicle or a smartphone) configured with a shorter TRS period. A higher mobility device may be configured with a shorter TRS period in order to update the time/frequency synchronization at a higher frequency to compensate for a Doppler frequency shift and/or other changes associated with the device changing positions. In some aspects, the first sidelink UE may transmit TRS(s) at different periodicities based on the mobility of the second sidelink UE. In this regard, the second sidelink UE may transmit an indicator to the first sidelink UE indicating a mobility associated with the second sidelink UE. For example, the indicator may include a type (e.g., a class) of UE (e.g., a vehicle, a sensor, a PLC, a roadside unit) that indicates a mobility of the second sidelink UE. In some aspects, the second sidelink UE may transmit to the first sidelink UE an indication of the second sidelink UE's speed and/or direction. The second sidelink UE's speed and direction may be determined based on a GPS receiver, RF triangulation, or other suitable method. In some aspects, the first sidelink UE may transmit a new TRS periodicity to the second sidelink UE when the mobility of the second sidelink UE changes (e.g., mobility change of the second sidelink UE satisfies a threshold).

The TRS periodicity may indicate the times at which the first sidelink UE transmits the TRS(s) to the second sidelink UE. The first UE may transmit an indicator indicating a TRS window (e.g., a resource selection window). The TRS window may be a time period in which the first sidelink UE transmits the TRS(s). The TRS window may be indicated in the communication, at action 1210, that includes the indicator indicating the TRS periodicity and/or the first sidelink UE may transmit the indicator indicating the TRS window in a separate communication. For example, the first sidelink UE may transmit the indicator indicating the TRS window to the second sidelink UE via SCI (e.g., SCI-1 and/or SCI-2), a PSSCH, a PSCCH, an RRC message, a MAC-CE message, or other suitable communication. The TRS window may indicate a starting time and/or an ending time in which the first sidelink UE may transmit the TRS(s). In this regard, the starting time may correspond to a first slot index and the ending time may correspond to a second slot index (e.g., the last slot in the TRS window). In some instances, the first sidelink UE may transmit the TRS(s) in any slot between the first slot index and the second slot index defining the TRS window, including the slots associated with the first and second slot indexes. In this regard, the first sidelink UE may transmit the symbol index indication in a time domain resource allocation (TDRA). The TDRA may be carried by SCI-1 via the PSCCH. The first sidelink UE may randomly select a slot within the TRS window for transmitting the TRS(s).

In some aspects, the first sidelink UE may transmit an indicator indicating which slot in the TRS window the first sidelink UE will transmit the TRS(s). For example, the indicator may correspond to an offset from the beginning of the TRS window and/or a slot index. The slot index may be indicated in the communication at action 1210 that includes the indicator indicating the TRS periodicity and/or the indicator indicating the TRS window, and/or the first sidelink UE may transmit the indicator indicating the slot index in a separate communication. For example, the first sidelink UE may transmit the indicator indicating the slot index to the second sidelink UE via SCI (e.g., SCI-1 and/or SCI-2), a PSSCH, a PSCCH, an RRC message, a MAC-CE message, or other suitable communication. Different TRS transmitting UEs may select different offsets from the beginning of the TRS window in order to avoid resource collision among the sidelink UEs intending to transmit TRS(s). In some aspects, the first sidelink UE may select (e.g., randomly select) a different slot in the TRS window for each instance of periodic TRS transmission. In this case, the first sidelink UE may transmit the indicator of the selected TRS slot to the second sidelink UE before (e.g., x slots before) transmitting the TRS(s).

At action 1220, the method 1200 includes the first sidelink UE (e.g., the UE 115 or the UE 900) transmitting a TRS to the second sidelink UE based on the TRS periodicity, the TRS window, and/or the slot index. In some aspects, the first sidelink UE may transmit the TRS(s) in time/frequency resources of a slot indicated by the slot index. In this regard, the first sidelink UE may randomly select the time/frequency resources for transmitting the TRS(s). The first sidelink UE may transmit the TRS(s) in a symbol of the slot after one or more symbols that include a physical sidelink control channel (PSCCH). The first sidelink UE may transmit the TRS(s) in a symbol of the slot after the PSCCH to avoid puncturing the SCI-1 carried by the PSCCH. The first sidelink UE may transmit one or more TRSs in the slot. For example, the first sidelink UE may transmit multiple TRSs to multiple sidelink UEs including the second sidelink UE. In some instances, when the first sidelink UE transmits multiple TRSs in a slot the TRSs may be separated by n number of symbols in a comb-n pattern. The multiple TRSs may be separated by one, two, three, four, or more symbols in a comb-n pattern (e.g., where n equals one, two, three, four, or more). The first sidelink UE may transmit the multiple TRSs in symbols after a PSCCH symbol. In some aspects, the first sidelink UE may transmit PSSCHs in symbols between the symbols in which the first sidelink UE transmits the TRSs. For example, the first sidelink UE may transmit the multiple TRSs in symbols 5 and 9 and transmit the PSSCHs in symbols 6-8. In some aspects, the first sidelink UE may transmit an indication to the second sidelink UE indicating the symbols (e.g., the symbol indexes) of the slot in which the TRSs will be transmitted. In this regard, the first sidelink UE may transmit the symbol index indication in a time domain resource allocation (TDRA). The TDRA may be carried by SCI-1 via the PSCCH.

In some aspects, the first sidelink UE may transmit multiple TRSs in a slot where each TRS in the slot is separated by m number of frequency subchannels in a comb-m pattern. The multiple TRSs may be separated by one, two, three, four, or more subchannels in a comb-m pattern (e.g., where m equals one, two, three, four, or more). In some aspects, the first sidelink UE may transmit an indication to the second sidelink UE indicating the subchannels in which the TRSs will be transmitted. In this regard, the first sidelink UE may transmit the indication in a frequency domain resource allocation (FDRA). The FDRA may be carried by SCI-1 via a PSCCH. In some aspects, the time/frequency resources and/or the comb pattern may be indicated to the second sidelink UE as a pattern index by the first sidelink UE via SCI. In some instances, the pattern index may indicate a preconfigured combination of time/frequency resources and the comb pattern. The first sidelink UE may transmit the TRS(s) to the second sidelink UE in corresponding time/frequency resources of periodic slots. In other words, each of the periodic slots that include the TRS(s) from the first sidelink UE may include the TRS(s) in the same symbol indexes and/or the same frequency subchannels.

The first sidelink UE may transmit multiple TRSs in symbols following the PSCCH where each TRS in the slot is separated by m number of frequency subchannels in a comb-m pattern. The multiple TRSs may be separated by one, two, three, four, or more subchannels in a comb-m pattern (e.g., where m equals one, two, three, four, or more). Each of the TRSs may be transmitted in the same or different frequency subchannel(s). For example, a first TRS may be transmitted in a first subchannel (e.g., subchannel index 0), a second TRS may be transmitted in a second subchannel (e.g., subchannel index 0+x), a third TRS may be transmitted in a third subchannel (e.g., subchannel index 0+2x), etc. Each of the subchannels may be separated by x number of subchannels. The first sidelink UE may transmit the TRS configuration to the second sidelink UE indicating the time/frequency resources associated with the TRSs. In some aspects, the first sidelink UE may transmit an indication in a TDRA to the second sidelink UE indicating the symbols in which the TRSs will be transmitted. The TDRA may be carried by SCI (e.g., SCI-1 and/or SCI-2) via the PSCCH. In some aspects, the first sidelink UE may transmit an indication in a FDRA to the second sidelink UE indicating the subchannels in which the TRSs will be transmitted. The FDRA may be carried by SCI (e.g., SCI-1 and/or SCI-2) via the PSCCH.

In some aspects, the first sidelink UE may transmit the TRS(s) to the second sidelink UE in a slot that includes a PSSCH. The slot may include an indicator (e.g., a trigger) in the SCI-1 and/or the SCI-2 that indicates to the second sidelink UE that the slot includes the TRS(s) and/or the PSSCH. Before decoding the SCI-2, the second sidelink UE may not know that the slot includes a TRS. The SCI-2 may have a common configuration among the sidelink UEs, including the second sidelink UE, such that the sidelink UEs may decode the SCI-2 from each sidelink UE that is transmitting a TRS. The TRSs may be transmitted in symbols after the symbols that include the SCI-2. The TRSs may be transmitted in symbols that do not include a DMRS to avoid collision with the DMRS. The second sidelink UE may decode the SCI-2 to determine if the PSSCH is intended for the second sidelink UE by matching the UE destination ID in the SCI-2 with the ID associated with the second sidelink UE. The TRS(s) may be carried by symbols different from the symbols carrying the PSSCH enabling the transmit power associated with the TRS(s) to remain constant.

In some aspects, the first sidelink UE may transmit the TRS(s) in time/frequency resources of a dedicated resource pool. The dedicated resource pool may reserve slots exclusively for periodic transmission of TRSs. The transmission of PSSCHs may be excluded from the resources of the dedicated resource pool. The resources of a dedicated resource pool may be determined and/or set by the first sidelink UE transmitting the TRS(s), another sidelink UE transmitting TRS(s) (e.g., a high-end sidelink UE such as a programmable logic controller or roadside unit), a BS (e.g., the BS 105 or 1000), or other suitable device. The sidelink UEs intending to transmit PSSCHs may receive an indication of the resources associated with the dedicated resource pool and avoid scheduling PSSCH transmissions in those resources. The sidelink UEs intending to transmit PSSCHs may receive the indication of the resources of the dedicated resource pool via SCI-1, SCI-2, or other suitable communication. The sidelink UEs intending to transmit TRS(s) in the dedicated resource pool (e.g., reserved periodic slots) may select (e.g., randomly select) resources from the dedicated resource pool. For example, the first sidelink UE may select contiguous symbol indexes 4-7 and frequency comb index 0 in the reserved periodic slot while another sidelink UE may select contiguous symbol indexes 8-11 and frequency comb index 1 in the reserved periodic slot. Each of the sidelink UEs intending to transmit TRS(s) may receive the indication of the dedicated resource pool and the resources selected by other TRS transmitting UEs in order to avoid selecting resources previously selected by the other TRS transmitting UEs.

In some aspects, one or more sidelink UEs may transmit PSSCHs in the same slot as the TRS(s) transmitted by the first sidelink UE. In this case, the one or more sidelink UEs intending to transmit PSSCHs may rate match around the resource elements scheduled to carry the TRS(s) transmitted by the first sidelink UE and other sidelink UEs. The one or more UEs may schedule the transmission of the PSSCHs in resource elements other than the REs used to carry the TRS(s) to avoid interfering with the TRS(s). In some instances, the one or more sidelink UEs may determine the TRS rate match patterns by receiving SCI from the sidelink UEs that are scheduling the TRS(s). The SCI transmitted by the sidelink UEs that are scheduling the TRS(s) may indicate the REs (e.g., a TRS resource pattern field) in the slot that the one or more PSSCH transmitting UEs need to avoid scheduling the PSSCHs in. Additionally or alternatively, the sidelink UEs intending to transmit PSSCHs may select slots for PSSCH transmission other than slots that include TRS(s). In some instances, when a sidelink UE transmits a PSSCH in the same symbol as a TRS, the sidelink UE may boost the power transmission level of the PSSCH to match the power level of the TRS to maintain a constant power level in the REs of the symbol that include the PSSCH and TRS.

In some aspects, the first sidelink UE may periodically transmit TRS(s) to sidelink UEs, including the second sidelink UE, based on the periodicity. In this manner, the first sidelink UE may transmit TRSs to multiple sidelink UEs on a regular basis, which can increase the accuracy of the time/frequency synchronization with the TRS receiving sidelink UEs. Each of the sidelink UEs transmitting the TRS(s) to the second sidelink UE may transmit the TRS(s) in the same slot or a different slot from the first sidelink UE. The first sidelink UE may synchronize time and frequency with each of the sidelink UEs that the first sidelink UE transmits TRSs to. In some aspects, the first sidelink UE may synchronize time and frequency with a subset of the sidelink UEs that the first sidelink UE transmits TRSs to. The first sidelink UE may update time/frequency tracking loops for each of the sidelink UEs and/or a subset of the sidelink UEs that it transmits TRSs to.

The first sidelink UE may transmit a PSSCH in a slot different from the slot(s) that the first sidelink UE transmits the TRS(s) in. The slot that the first sidelink UE transmits the PSSCH in may not include a TRS(s). The first sidelink UE may transmit the PSSCH based on updating time/frequency tracking loops with the second sidelink UE (or other sidelink UE) based on TRS(s) transmitted in a slot previous to the slot that includes the PSSCH.

In some aspects, the first sidelink UE may transmit a TRS that is intended for a plurality (e.g., a group) of sidelink UEs. The group of sidelink UEs may include the second sidelink UE. For example, the first sidelink UE may transmit the TRS in a groupcast communication. The groupcast communication may be intended for a group of sidelink UEs to receive the TRS and synchronize time and frequency to the first sidelink UE. The first sidelink UE may transmit the TRS(s) to the group at a constant power level. The constant power level may be determined by the largest path loss associated the group of sidelink UEs so that the sidelink UE having the largest path loss (e.g., the sidelink UE in the group furthest away from the first sidelink UE) is able to receive the TRS(s). The first sidelink UE may conserve resources by transmitting the TRS in a groupcast communication as compared to transmitting the TRSs in unicast communications to each member of the group. The groupcast communication may include a group ID that identifies the group of sidelink UEs to receive the TRS. In this regard, the first sidelink UE may transmit (e.g., assign) a group ID via SCI-1 and/or SCI-2 (e.g., a codepoint in the SCI-1 and/or SCI-2) in the groupcast communication or a unicast communication to the second sidelink UE. If the SCI-1 includes the groupcast ID and the TRS configuration, the slot may include a PSCCH to carry the SCI-1 and exclude the PSSCH. If the SCI-2 includes the groupcast ID and the TRS configuration, the slot may include a PSSCH to carry the SCI-2 and exclude the PSCCH. Additionally or alternatively, the second sidelink UE may receive (e.g., be assigned) a group ID from a BS (e.g., the BS 105 or 1000) via RRC signaling. The second sidelink UE may determine that the groupcast ID includes the second sidelink UE's ID. Based on the second sidelink UE determining that the groupcast ID includes the second sidelink UE's ID, the second sidelink UE may receive the TRS(s). The second sidelink UE may periodically receive the TRS(s) based on whether the SCI-1 and/or SCI-2 indicates a groupcast ID that includes the second sidelink UE's ID. The second sidelink UE may update time/frequency tracking loop with the first sidelink UE based on the TRS(s) carried by the groupcast communication.

In some aspects, the first sidelink UE may transmit the TRS (e.g., a standalone TRS) to the second sidelink UE in a slot that does not include a PSSCH. In this regard, the first sidelink UE may transmit a communication to the second sidelink UE that includes an AGC symbol, a PSCCH, one or more TRSs, and a guard symbol. In some aspects, when multiple TRSs are transmitted, the TRSs may be transmitted in adjacent symbols. The adjacent symbols may be contiguous with no gaps between the symbols. Any number of TRSs may be transmitted within any symbol. Any number of symbols may include TRSs. Additionally or alternatively, the first symbol, (e.g., symbol index 0) may carry the AGC, the next 2 or 3 symbols (e.g., symbol indexes 1 and 2 or symbol indexes 1, 2, and 3) may carry a PSCCH, and the symbols following the PSCCH (e.g., symbol indexes 4-13)

may carry the TRSs. The PSCCH may carry SCI-1 and/or SCI-2. The second sidelink UE may decode the SCI-1 and/or the SCI-2. The SCI-1 and/or the SCI-2 may indicate (e.g., trigger) to the second sidelink UE that the symbols after the PSCCH may carry the TRSs. The SCI-1 and/or the SCI-2 may indicate, without limitation, the periodicity, the TRS transmission window, the group ID, the time/frequency resources associated with the TRS(s) transmitted to the second sidelink UE, the time/frequency resources associated with the TRS resource pool, and/or the slot index associated with the TRS(s).

In some aspects, the first sidelink UE may transmit an indicator (e.g. a trigger) indicating the first sidelink UE is transmitting a TRS to the second sidelink UE. The first sidelink UE may transmit the indicator to the second sidelink UE via SCI (e.g., SCI-1 and/or SCI-2). The first sidelink UE may transmit the TRSs periodically based on the indicator indicating the transmission periodicity of the TRS. In some aspects, the first sidelink UE may transmit the indicator multiple times. In some aspects, the first sidelink UE may transmit the indicator multiple times within a time period (e.g., within a number of slots). Transmitting the indicator multiple times may increase the probability that the second sidelink UE will receive the indicator. For example, if the second sidelink UE is a half-duplex sidelink UE, the second sidelink UE may be in transmit mode when the first sidelink UE transmits the indicator. By transmitting the indicator multiple times, the probability is increased that the half-duplex second sidelink UE will receive the indicator when the half-duplex second sidelink UE is in receive mode.

In some aspects the first sidelink UE may transmit a communication including a TRS to the second sidelink UE in a slot that does not include a PSSCH before (e.g., immediately before) transmitting a communication to the second sidelink UE that does include a PSSCH. The first sidelink UE may transmit the TRS in a slot without a PSSCH before transmitting a communication in a slot with a PSSCH in order to synchronize time and frequency (e.g., perform time/frequency compensation) with the first sidelink UE. In this manner, the time and frequency may be better synchronized between the first and the second sidelink UEs increasing the probability of successful decoding of the PSSCH by the second sidelink UE as compared to transmitting the TRS in a slot after the PSSCH.

In some aspects the first sidelink UE may transmit a communication in a slot including a TRS(s) and a PSSCH to the second sidelink UE. The second sidelink UE may utilize the TRS(s) received in the slot to synchronize time and frequency with the first sidelink UE before decoding the PSSCH. In this manner, the time and frequency may be better synchronized with the first sidelink UE increasing the probability of successful decoding of the PSSCH as compared to attempting to decode the PSSCH before synchronizing the time and frequency with the first sidelink UE.

Additionally or alternatively, the first sidelink UE may transmit the TRS(s) (e.g., a standalone TRS) to the second sidelink UE in a slot that does not include a PSSCH or a PSCCH. The first sidelink UE may transmit the TRS(s) to the second sidelink UE in a slot that includes an AGC symbol, one or more TRS(s), and a guard symbol. In some aspects, the TRS(s) may be transmitted in adjacent symbols that are contiguous with no gaps between the symbols. Any number of TRS(s) may be transmitted within any symbol. Any number of symbols may include TRS(s). The first sidelink UE may transmit a communication in a previous slot that carries an SCI-1 and/or SCI-2. The SCI-1 and/or the SCI-2 in the previous slot may indicate to the second sidelink UE that a subsequent slot may carry the TRS(s). The SCI-1 and/or the SCI-2 may indicate an index associated with the slot that includes the TRS.

In some aspects, the first sidelink UE may suspend (e.g., temporarily discontinue) the periodic transmission of the TRS(s) to the second sidelink UE. The first sidelink UE may suspend the periodic transmission of the TRS(s) to the second sidelink UE based on a transmit buffer status associated with the first sidelink UE. For example, if the first sidelink UE (e.g., the TRS transmitter) has no data to transmit to the second sidelink UE or other sidelink UEs and/or is not expecting to transmit data to the second sidelink UE or other sidelink UEs during the next few TRS periods, the first sidelink UE may suspend transmission of the TRS(s) until the first sidelink UE has data to transmit to the second sidelink UE or another sidelink UE. Suspending transmission of the periodic TRS(s) may conserve time/frequency resources in the wireless network and conserve processing/power resources in the first sidelink UE and/or the second sidelink UE. The first sidelink UE may transmit an indicator to the second sidelink UE indicating that the periodic TRS transmission will be suspended. In this regard, the first sidelink UE may transmit the TRS suspension indicator to the second sidelink UE in SCI (e.g., SCI-1 and/or SCI-2). The TRS suspension indicator may include a duration of time of the TRS transmission suspension. The duration of time may be indicated by a number of TRS transmission periods, a number of slots, a number of frames, a set time (e.g., a number of milliseconds), or other suitable time duration. The time duration of TRS transmission suspension may be a preset (e.g., preconfigured) time duration and/or indicated in the TRS suspension indicator. In some aspects, when the time duration of TRS transmission suspension is preset, the first sidelink UE may resume TRS transmission without further indication to the second sidelink UE. In some aspects, the first sidelink UE may transmit an additional TRS suspension indicator before the time duration expires to extend the period of time of TRS transmission suspension. When the first sidelink UE has data to transmit after suspending the TRS transmission, the first sidelink UE may transmit an indicator to the second sidelink UE indicating that the periodic TRS transmission will be resumed. In this regard, the first sidelink UE may transmit the TRS resumption indicator to the second sidelink UE in SCI (e.g., SCI-1 and/or SCI-2). The first sidelink UE may transmit the resumed periodic TRS(s) in a TRS window of a slot indicated by SCI. The second sidelink UE may acquire time and frequency synchronization with the first sidelink UE based on the TRS(S) and receive the data via a PSSCH in a subsequent slot. Additionally or alternatively, the first sidelink UE may transmit the resumed periodic TRS(s) in a TRS window of a slot indicated by SCI, acquire frequency synchronization with the second sidelink UE based on the TRS(s), and transmit the data via a PSSCH in the same slot as the TRS(s).

At action 1230, the method 1200 includes the first sidelink UE (e.g., the UE 115 or the UE 900) transmitting, to the second sidelink UE synchronized in time and frequency with the first sidelink UE, a PSSCH communication based on the TRS(s) transmitted at action 1220. The TRS(s) may assist the second sidelink UE to synchronize time and frequency tracking with the first sidelink UE and each of the sidelink UEs that the first sidelink UE transmits TRSs to. The TRS(s) may be a specific configuration of the CSI-RS. In some aspects, the TRS(s) may be configured as a non-zero power (NZP) CSI-RS resource set. The TRS(s) may allow the second sidelink UE to track frequency and time variations with a high resolution (e.g., enable fine tuning of time/frequency tracking). The second sidelink UE may use a combination of periodic TRS(s) across multiple slots (e.g., a number of previous slots that include the TRS(s)) to acquire time and frequency synchronization with the first sidelink UE. Improved time/frequency synchronization may benefit the performance of data transfer between the first sidelink UE and the sidelink UE.

In some aspects, the first sidelink UE may transmit the PSSCH in the same slot as the TRS(s) and/or in a slot following the slot(s) that includes the periodic TRS(s). In some instances, the first sidelink UE may transmit the PSSCH in a slot immediately following a slot that includes a periodic TRS. In some instances, the first sidelink UE may transmit the PSSCH in a slot following a slot that includes a periodic TRS that is separated from the slot including the periodic TRS by one or more slots. The second sidelink UE may utilize the TRSs received in the same slot as the PSSCH and/or in prior slots that include the TRS(s) to synchronize time and frequency with the first sidelink UE before decoding the PSSCH. In this manner, the time and frequency may be better synchronized with the first sidelink UE increasing the probability of successful decoding of the PSSCH as compared to the second sidelink UE attempting to decode the PSSCH before synchronizing time and frequency with the first sidelink UE.

Further aspects of the present disclosure include the following:

Aspect 1 includes a method of wireless communication performed by a first sidelink user equipment (UE), the method comprising receiving, from a second sidelink UE, an indicator indicating a tracking reference signal (TRS) periodicity; receiving, from the second sidelink UE, a TRS based on the TRS periodicity; acquiring time and frequency synchronization with the second sidelink UE based on the TRS; and receiving a physical sidelink shared channel (PSSCH) communication based on the time and frequency synchronization with the second sidelink UE.

Aspect 2 includes the method of aspect 1, further comprising receiving, from the second sidelink UE, an indicator indicating an index associated with a first slot in a TRS window, wherein the receiving the TRS comprises receiving the TRS in the first slot in the TRS window; receiving, from a third sidelink UE, an indicator indicating a second index associated with a second slot in the TRS window; and receiving a second TRS in the second slot in the TRS window.

Aspect 3 includes the method of any of aspects 1-2, wherein the receiving the TRS comprises at least one of receiving the TRS in a symbol of a slot after an automatic gain control (AGC) symbol; or receiving the TRS in a symbol of a slot after a physical sidelink control channel (PSCCH) symbol.

Aspect 4 includes the method of any of aspects 1-3, further comprising receiving a second TRS in resource elements of a first slot, and wherein the receiving the TRS comprises receiving the TRS in resource elements of a second slot, wherein the resource elements of the second slot correspond to the resource elements of the first slot; the acquiring time and frequency synchronization with the second sidelink UE is further based on the second TRS; and the receiving the PSSCH comprises receiving the PSSCH in a third slot.

Aspect 5 includes the method of any of aspects 1-4, further comprising receiving, from the second sidelink UE, an indicator indicating at least one of time resources associated with the TRS; or frequency resources associated with the TRS.

Aspect 6 includes the method of any of aspects 1-5, further comprising receiving, from the second sidelink UE, an indicator indicating a group ID associated with a plurality of sidelink UEs, wherein the TRS is associated with the plurality of sidelink UEs; and the plurality of sidelink UEs includes the first sidelink UE.

Aspect 7 includes the method of any of aspects 1-6, wherein the receiving the PSSCH communication comprises receiving the PSSCH communication in a same slot as the TRS, wherein the PSSCH communication is rate matched around the TRS.

Aspect 8 includes the method of any of aspects 1-7, further comprising receiving, from the second sidelink UE, a second TRS in a first slot, wherein the receiving the TRS comprises receiving the TRS in the first slot; and the receiving the PSSCH communication comprises receiving the PSSCH communication in a second slot, the second slot being different than the first slot.

Aspect 9 includes the method of any of aspects 1-8, further comprising receiving, from the second sidelink UE, an indicator indicating a suspension of TRS transmission by the second sidelink UE.

Aspect 10 includes the method of any of aspects 1-9, wherein the TRS periodicity is based on a mobility associated with the first sidelink UE.

Aspect 11 includes a method of wireless communication performed by a first sidelink user equipment (UE), the method comprising transmitting, to a second sidelink UE, an indicator indicating a tracking reference signal (TRS) periodicity; transmitting, to the second sidelink UE, a TRS based on the TRS periodicity; and transmitting, to the second sidelink UE synchronized in time and frequency with the first sidelink UE, a physical sidelink shared channel (PSSCH) communication.

Aspect 12 includes the method of aspect 11, wherein the transmitting the TRS comprises at least one of transmitting the TRS in a symbol of a slot after an automatic gain control (AGC) symbol; or transmitting the TRS in a symbol of a slot after a physical sidelink control channel (PSCCH) symbol.

Aspect 13 includes the method of any of aspects 11-12, further comprising transmitting a second TRS in resource elements of a first slot, and wherein the transmitting the TRS comprises transmitting the TRS in resource elements of a second slot, wherein the resource elements of the second slot correspond to the resource elements of the first slot; and the transmitting the PSSCH comprises transmitting the PSSCH in a third slot.

Aspect 14 includes the method of any of aspects 11-13, further comprising transmitting, to the second sidelink UE, an indicator indicating at least one of time resources associated with the TRS; or frequency resources associated with the TRS.

Aspect 15 includes the method of any of aspects 11-14, further comprising transmitting, to the second sidelink UE, an indicator indicating a suspension of TRS transmission based on a buffer status associated with the first sidelink UE.

Aspect 16 includes a non-transitory computer-readable medium storing one or more instructions for wireless communication, the one or more instructions comprising one or more instructions that, when executed by one or more processors of a first sidelink user equipment (UE), cause the one or more processors to perform any one of aspects 1-10.

Aspect 16 includes a non-transitory computer-readable medium storing one or more instructions for wireless communication, the one or more instructions comprising one or more instructions that, when executed by one or more processors of a first sidelink user equipment (UE), cause the one or more processors to perform any one of aspects 11-15.

Aspect 17 includes a first sidelink user equipment (UE) comprising one or more means to perform any one or more of aspects 1-10.

Aspect 19 includes a first sidelink user equipment (UE) comprising one or more means to perform any one or more of aspects 11-15.

Aspect 20 includes a first sidelink user equipment (UE) comprising a memory, a transceiver and at least one processor coupled to the memory and the transceiver, wherein the first sidelink UE is configured to perform any one or more of aspects 1-10.

Aspect 21 includes a first sidelink user equipment (UE) comprising a memory, a transceiver and at least one processor coupled to the memory and the transceiver, wherein the first sidelink UE is configured to perform any one or more of aspects 11-15.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular instances illustrated and described herein, as they are merely by way of some examples thereof, but rather, should be fully commensurate with that of the claims appended hereafter and their functional equivalents.

What is claimed is:

1. A method of wireless communication performed by a first sidelink user equipment (UE), the method comprising:
   receiving, from a second sidelink UE, an indicator indicating a tracking reference signal (TRS) periodicity;
   receiving, from the second sidelink UE via a groupcast communication associated with a plurality of UEs, a TRS based on the TRS periodicity;
   acquiring time and frequency synchronization with the second sidelink UE based on the TRS; and
   receiving a physical sidelink shared channel (PSSCH) communication based on the time and frequency synchronization with the second sidelink UE.

2. The method of claim 1, further comprising:
   receiving, from the second sidelink UE, an indicator indicating an index associated with a first slot in a TRS window, wherein the receiving the TRS comprises receiving the TRS in the first slot in the TRS window;
   receiving, from a third sidelink UE, an indicator indicating a second index associated with a second slot in the TRS window; and
   receiving a second TRS in the second slot in the TRS window.

3. The method of claim 1, wherein the receiving the TRS comprises at least one of:
   receiving the TRS in a symbol of a slot after an automatic gain control (AGC) symbol; or
   receiving the TRS in a symbol of a slot after a physical sidelink control channel (PSCCH) symbol.

4. The method of claim 1, further comprising:
   receiving a second TRS in resource elements of a first slot, and
   wherein:
      the receiving the TRS comprises receiving the TRS in resource elements of a second slot, wherein the resource elements of the second slot correspond to the resource elements of the first slot;
      the acquiring time and frequency synchronization with the second sidelink UE is further based on the second TRS; and
      the receiving the PSSCH comprises receiving the PSSCH in a third slot.

5. The method of claim 1, further comprising:
   receiving, from the second sidelink UE, an indicator indicating at least one of:
      time resources associated with the TRS; or
      frequency resources associated with the TRS.

6. The method of claim 1, further comprising:
   receiving, from the second sidelink UE, an indicator indicating a group ID associated with a plurality of sidelink UEs, wherein:
      the TRS is associated with the plurality of sidelink UEs; and
      the plurality of sidelink UEs includes the first sidelink UE.

7. The method of claim 1, wherein the receiving the PSSCH communication comprises receiving the PSSCH communication in a same slot as the TRS, wherein the PSSCH communication is rate matched around the TRS.

8. The method of claim 1, further comprising:
receiving, from the second sidelink UE, a second TRS in a first slot, wherein:
the receiving the TRS comprises receiving the TRS in the first slot; and
the receiving the PSSCH communication comprises receiving the PSSCH communication in a second slot, the second slot being different than the first slot.

9. The method of claim 1, further comprising:
receiving, from the second sidelink UE, an indicator indicating a suspension of TRS transmission by the second sidelink UE.

10. The method of claim 1, wherein the TRS periodicity is based on a mobility associated with the first sidelink UE.

11. A method of wireless communication performed by a first sidelink user equipment (UE), the method comprising:
transmitting, to a second sidelink UE, an indicator indicating a tracking reference signal (TRS) periodicity;
transmitting, to the second sidelink UE via a groupcast communication associated with a plurality of UEs, a TRS based on the TRS periodicity; and
transmitting, to the second sidelink UE synchronized in time and frequency with the first sidelink UE, a physical sidelink shared channel (PSSCH) communication.

12. The method of claim 11, wherein the transmitting the TRS comprises at least one of:
transmitting the TRS in a symbol of a slot after an automatic gain control (AGC) symbol; or
transmitting the TRS in a symbol of a slot after a physical sidelink control channel (PSCCH) symbol.

13. The method of claim 11, further comprising:
transmitting a second TRS in resource elements of a first slot, and wherein:
the transmitting the TRS comprises transmitting the TRS in resource elements of a second slot, wherein the resource elements of the second slot correspond to the resource elements of the first slot; and
the transmitting the PSSCH comprises transmitting the PSSCH in a third slot.

14. The method of claim 11, further comprising:
transmitting, to the second sidelink UE, an indicator indicating at least one of:
time resources associated with the TRS; or
frequency resources associated with the TRS.

15. The method of claim 11, further comprising:
transmitting, to the second sidelink UE, an indicator indicating a suspension of TRS transmission based on a buffer status associated with the first sidelink UE.

16. A first sidelink user equipment (UE) comprising:
a memory;
a transceiver; and
at least one processor coupled to the memory and the transceiver, wherein the first sidelink UE is configured to:
receive, from a second sidelink UE, an indicator indicating a tracking reference signal (TRS) periodicity;
receive, from the second sidelink UE via a groupcast communication associated with a plurality of UEs, a TRS based on the TRS periodicity;
acquire time and frequency synchronization with the second sidelink UE based on the TRS; and
receive a physical sidelink shared channel (PSSCH) communication based on the time and frequency synchronization with the second sidelink UE.

17. The first sidelink UE of claim 16, wherein the first sidelink UE is further configured to:
receive, from the second sidelink UE, an indicator indicating an index associated with a first slot in a TRS window;
receive the TRS in the first slot in the TRS window;
receive, from a third sidelink UE, an indicator indicating a second index associated with a second slot in the TRS window; and
receive a second TRS in the second slot in the TRS window.

18. The first sidelink UE of claim 16, wherein the first sidelink UE is further configured to at least one of:
receive the TRS in a symbol of a slot after an automatic gain control (AGC) symbol; or
receive the TRS in a symbol of a slot after a physical sidelink control channel (PSCCH) symbol.

19. The first sidelink UE of claim 16, wherein the first sidelink UE is further configured to:
receive a second TRS in resource elements of a first slot;
receive the TRS in resource elements of a second slot, wherein the resource elements of the second slot correspond to the resource elements of the first slot;
acquire time and frequency synchronization with the second sidelink UE further based on the second TRS; and
receive the PSSCH in a third slot.

20. The first sidelink UE of claim 16, wherein the first sidelink UE is further configured to:
receive, from the second sidelink UE, an indicator indicating at least one of:
time resources associated with the TRS; or
frequency resources associated with the TRS.

21. The first sidelink UE of claim 16 wherein the first sidelink UE is further configured to:
receive, from the second sidelink UE, an indicator indicating a group ID associated with a plurality of sidelink UEs, wherein:
the TRS is associated with the plurality of sidelink UEs; and
the plurality of sidelink UEs includes the first sidelink UE.

22. The first sidelink UE of claim 16, wherein the first sidelink UE is further configured to:
receive the PSSCH communication in a same slot as the TRS, wherein the PSSCH communication is rate matched around the TRS.

23. The first sidelink UE of claim 16, wherein the first sidelink UE is further configured to:
receive, from the second sidelink UE, a second TRS in a first slot;
receive the TRS in the first slot; and
receive the PSSCH communication in a second slot, the second slot being different than the first slot.

24. The first sidelink UE of claim 16, wherein the first sidelink UE is further configured to:
receive, from the second sidelink UE, an indicator indicating a suspension of TRS transmission by the second sidelink UE.

25. The first sidelink UE of claim 16, wherein the TRS periodicity is based on a mobility associated with the first sidelink UE.

26. A first sidelink user equipment (UE) comprising:
a memory;
a transceiver; and
at least one processor coupled to the memory and the transceiver, wherein the first sidelink UE is configured to:

transmit, to a second sidelink UE, an indicator indicating a tracking reference signal (TRS) periodicity;
transmit, to the second sidelink UE via a groupcast communication associated with a plurality of UEs, a TRS based on the TRS periodicity; and
transmit, to the second sidelink UE synchronized in time and frequency with the first sidelink UE, a physical sidelink shared channel (PSSCH) communication.

27. The first sidelink UE of claim 26, wherein the first sidelink UE is further configured to at least one of:
transmit the TRS in a symbol of a slot after an automatic gain control (AGC) symbol; or
transmit the TRS in a symbol of a slot after a physical sidelink control channel (PSCCH) symbol.

28. The first sidelink UE of claim 26, wherein the first sidelink UE is further configured to:
transmit a second TRS in resource elements of a first slot;
transmit the TRS in resource elements of a second slot, wherein the resource elements of the second slot correspond to the resource elements of the first slot; and
transmit the PSSCH in a third slot.

29. The first sidelink UE of claim 26, wherein the first sidelink UE is further configured to:
transmit, to the second sidelink UE, an indicator indicating at least one of:
time resources associated with the TRS; or
frequency resources associated with the TRS.

30. The first sidelink UE of claim 26, wherein the first sidelink UE is further configured to:
transmit, to the second sidelink UE, an indicator indicating a suspension of TRS transmission based on a buffer status associated with the first sidelink UE.

* * * * *